US012763902B2

(12) United States Patent
Liu et al.

(10) Patent No.: US 12,763,902 B2
(45) Date of Patent: Oct. 13, 2026

(54) SYSTEM AND METHOD FOR UPLINK AND DOWNLINK IN MULTI-POINT COMMUNICATIONS

(71) Applicant: Huawei Technologies Co., Ltd., Shenzhen (CN)

(72) Inventors: Jialing Liu, Palatine, IL (US); Weimin Xiao, Hoffman Estates, IL (US); Qian Cheng, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 500 days.

(21) Appl. No.: 18/164,293

(22) Filed: Feb. 3, 2023

(65) Prior Publication Data

US 2023/0188293 A1 Jun. 15, 2023

Related U.S. Application Data

(63) Continuation of application No. PCT/US2021/045053, filed on Aug. 6, 2021.

(Continued)

(51) Int. Cl.
*H04L 5/00* (2006.01)

(52) U.S. Cl.
CPC .......... *H04L 5/0051* (2013.01); *H04L 5/0035* (2013.01); *H04L 5/0092* (2013.01)

(58) Field of Classification Search
CPC ... H04L 5/0051; H04L 5/0035; H04L 5/0092; H04L 5/001; H04L 5/0048; H04L 5/0053;
(Continued)

(56) References Cited

U.S. PATENT DOCUMENTS

2012/0057535 A1 3/2012 Zhang et al.
2016/0014778 A1 1/2016 Zhou et al.
(Continued)

FOREIGN PATENT DOCUMENTS

CN 110391881 A 10/2019
WO 2019223712 A1 11/2019
WO 2020064555 A1 4/2020

OTHER PUBLICATIONS

Liao, et al., "Coordinated Multi-Point Downlink Transmission for Dense Small Cell Networks", IEEE Transactions on Vehicular Technology, vol. 68, Issue: 1, Jan. 2019.

*Primary Examiner* — Kenny S Lin
*Assistant Examiner* — Wilfred Thomas
(74) *Attorney, Agent, or Firm* — Slater Matsil, LLP

(57) ABSTRACT

Example wireless communication methods and apparatus are described. One example includes receiving first configuration information of a bandwidth part (BWP) in a carrier for a serving cell by a user equipment (UE). The first configuration information includes a first group of parameters and a first resource group (RG) on the BWP in the carrier for the serving cell. The UE receives second configuration information of the BWP in the carrier, where the second configuration information includes a second group of parameters and a second RG on the BWP in the carrier. Transmission or reception associated with the first RG is performed based on the first group of parameters. Transmission or reception associated with the second RG is performed based on the second group of parameters.

22 Claims, 12 Drawing Sheets

230

| Numerology | SCS (kHz) | Normal CP (µs) |
|---|---|---|
| 0 | 15 | 4.69 |
| 1 | 30 | 2.34 |
| 2 | 60 | 1.17 |
| 3 | 130 | 0.59 |
| 4 | 240 | 0.29 |
| 5 | 480 | 0.15 |
| [6] | 960 | 0.08 |

Related U.S. Application Data

(60) Provisional application No. 63/062,335, filed on Aug. 6, 2020.

(58) Field of Classification Search
CPC ..... H04L 5/0094; H04L 5/0023; H04L 5/005; H04B 7/06968; H04W 56/0045; H04W 56/0015
See application file for complete search history.

(56) References Cited

U.S. PATENT DOCUMENTS

| | | | | |
|---|---|---|---|---|
| 2018/0310300 | A1 | 10/2018 | Lin | |
| 2019/0132862 | A1* | 5/2019 | Jeon | H04L 5/0098 |
| 2019/0150110 | A1* | 5/2019 | Ko | H04J 11/00 370/350 |
| 2019/0215712 | A1 | 7/2019 | Babaei et al. | |
| 2019/0222286 | A1* | 7/2019 | Miao | H04L 5/0048 |
| 2020/0120622 | A1* | 4/2020 | Yoon | H04B 17/318 |
| 2020/0195398 | A1* | 6/2020 | Futaki | H04L 5/0092 |
| 2020/0367079 | A1* | 11/2020 | Chen | H04W 24/04 |
| 2021/0091900 | A1 | 3/2021 | Zhang et al. | |
| 2021/0352689 | A1* | 11/2021 | Jung | H04L 1/08 |
| 2022/0286191 | A1* | 9/2022 | Wei | H04B 7/06964 |
| 2023/0117326 | A1* | 4/2023 | Decarreau | H04B 7/088 370/329 |
| 2023/0189180 | A1* | 6/2023 | Yuan | H04W 56/0045 370/350 |
| 2023/0239123 | A1* | 7/2023 | Zhou | H04L 5/0023 370/329 |
| 2023/0269790 | A1* | 8/2023 | Müller | H04W 48/12 370/329 |

* cited by examiner

| Numerology | SCS (kHz) | Normal CP (μs) |
|---|---|---|
| 0 | 15 | 4.69 |
| 1 | 30 | 2.34 |
| 2 | 60 | 1.17 |
| 3 | 130 | 0.59 |
| 4 | 240 | 0.29 |
| 5 | 480 | 0.15 |
| [6] | 960 | 0.08 |

400

| | ID1 | ID2 | ID3 | ID4 | ID5 | ID6 | ID7 |
|---|---|---|---|---|---|---|---|
| Functionality | CSI-RS sequence generation | PDCCH DMRS sequence generation | PDCCH scrambling/randomization | PDSCH DMRS sequence generation | PDSCH scrambling | PUSCH DMRS sequence generation | PUSCH scrambling |
| 1st Group of IDs | ID1, 1 | ID2, 1 | ID3, 1 | ID4, 1 | ID5, 1 | ID6, 1 | ID7, 1 |
| 2nd Group of IDs | ID1, 2 | ID2, 2 | ID3, 2 | ID4, 2 | ID5, 2 | ID6, 2 | ID7, 2 |
| 3rd Group of IDs | ID1, 3 | ID2, 3 | ID3, 3 | ID4, 3 | ID5, 3 | ID6, 3 | ID7, 3 |

FIG. 4

600

| | TRP0 | TRP1 | TRPs tightly-synched | TRPs w/ fast backhaul | S-DCI / M-DCI | # resource groups |
|---|---|---|---|---|---|---|
| Scenario 1 | Cell w/ SSB | TRP w/o SSB | Y | Y | S | 1 (or 2) |
| Scenario 2 | Cell w/ SSB | TRP w/o SSB | Y | Y | M | 1 (or 2) |
| Scenario 3 | Cell w/ SSB | TRP w/o SSB | Y | N | M | 2 (or 1) |
| Scenario 4 | Cell w/ SSB | TRP w/o SSB | N | N | M | 2 |
| Scenario 5 | Cell w/ SSB | Cell w/ SSB | Y | Y | S | 2 |
| Scenario 6 | Cell w/ SSB | Cell w/ SSB | Y | Y | M | 2 |
| Scenario 7 | Cell w/ SSB | Cell w/ SSB | Y | N | M | 2 |
| Scenario 8 | Cell w/ SSB | Cell w/ SSB | N | N | M | 2 |

Cell w/ Covers Dual Connectivity

FIG. 6

SYSTEM AND METHOD FOR UPLINK AND DOWNLINK IN MULTI-POINT COMMUNICATIONS

CROSS-REFERENCE TO RELATED APPLICATIONS

This application is a continuation of International Application No. PCT/US2021/045053, filed on Aug. 6, 2021, and entitled "System and Method for Uplink and Downlink in Multi-Point Communications," which claims the benefit of U.S. Provisional Application No. 63/062,335, filed on Aug. 6, 2020, and entitled "System and Method for Uplink and Downlink in Multi-Point Communications," applications of which are hereby incorporated by reference in their entireties.

TECHNICAL FIELD

The present disclosure relates generally to wireless communications, and, in particular embodiments, to a system and method for uplink and downlink in multi-point communications.

BACKGROUND

Wireless communication systems include long term evolution (LTE), LTE-A, LTE-A-beyond systems, 5G LTE, 5G New Radio (NR), etc. A modern wireless communication system may include a plurality of NodeBs (NBs), which may also be referred to as base stations, network nodes, communications controllers, cells or enhanced NBs (eNBs), and so on. A NodeB may include one or more network points or network nodes using different radio access technologies (RATs) such as high speed packet access (HSPA) NBs or WiFi access points. A NodeB may be associated with a single network point or multiple network points. A cell may include a single network point or multiple network points, and each network point may have a single antenna or multiple antennas. A network point may correspond to multiple cells operating in multiple component carriers. Generally each component carrier in carrier aggregation is a serving cell, either a primary cell (PCell) or a secondary cell (SCell).

A cell or NodeB may serve a number of users (also commonly referred to as User Equipment (UE), mobile stations, terminals, devices, and so forth) over a period of time. A communication channel from a base station to a UE is generally referred to as a downlink (DL) channel, and a transmission from the base station to the UE is a downlink transmission. A communication channel from a UE to a base station is generally referred to an uplink (UL) channel, and a transmission from the UE to the base station is an uplink transmission. The UE receives timing advance (TA) commands associated with the configured TA group (TAG) to adjust its uplink transmission timing to synchronize with the network for uplink transmission so that uplink transmissions from multiple UEs arrive at the base station at about the same time in a transmission time interval (TTI). Likewise, the UE needs to receive DL reference signals (RS) or synchronization signal (SS) blocks, also called SS/physical broadcast channel (PBCH) block (SSB) to acquire and maintain the DL synchronization, such as via maintaining a DL timing tracking loop, based on which the UE places its FFT window inside the cyclic prefix (CP) for its DL reception. In addition, both UL and DL signals/channels need to be associated with some other signals for deriving the signal/channel properties, such as delay spread, Doppler shift, etc.

SUMMARY

The present disclosure is directed to methods and systems for wireless communications, and, in particular embodiments, to a system and method for uplink and downlink in multi-point communications. The methods and systems as described herein can be an applicable solution for multiple-transmission-reception-points (M-TRP) scenarios in LTE and 5G (new radio) systems.

In a first implementation, a method for wireless communication includes: receiving, by a user equipment (UE), first configuration information of a bandwidth part (BWP) in a carrier for a serving cell, the first configuration information comprising a first group of parameters and a first resource group (RG) on the BWP in the carrier for the serving cell; receiving, by the UE, second configuration information of the BWP in the carrier, the second configuration information comprising a second group of parameters and a second RG on the BWP in the carrier; and performing transmission or reception associated with the first RG based on the first group of parameters and performing transmission or reception associated with the second RG based on the second group of parameters.

In a second implementation, an electronic device includes: a non-transitory memory storage comprising instructions, and one or more hardware processors in communication with the memory storage, where the one or more hardware processors execute the instructions to perform operations including: receiving first configuration information of a bandwidth part (BWP) in a carrier for a serving cell, the first configuration information comprising a first group of parameters and a first resource group (RG) on the BWP in the carrier for the serving cell; receiving second configuration information of the BWP in the carrier, the second configuration information comprising a second group of parameters and a second RG on the BWP in the carrier; and performing transmission or reception associated with the first RG based on the first group of parameters and performing transmission or reception associated with the second RG based on the second group of parameters.

In a third implementation, a non-transitory computer-readable medium storing computer instructions for wireless communication, that when executed by one or more hardware processors, cause the one or more hardware processors to perform operations including: receiving, by a user equipment (UE), first configuration information of a bandwidth part (BWP) in a carrier for a serving cell, the first configuration information comprising a first group of parameters and a first resource group (RG) on the BWP in the carrier for the serving cell; receiving, by the UE, second configuration information of the BWP in the carrier, the second configuration information comprising a second group of parameters and a second RG on the BWP in the carrier; and performing transmission or reception associated with the first RG based on the first group of parameters and performing transmission or reception associated with the second RG based on the second group of parameters.

In a fourth implementation, a method for wireless communication includes: receiving, by a user equipment (UE), first configuration information of a bandwidth part (BWP) in a carrier for a serving cell, the first configuration information comprising a first group of parameters on the BWP in the carrier for the serving cell, the first group of parameters comprising a first physical cell identifier (PCI) of the serving cell; receiving, by the UE, second configuration information of the BWP in the carrier, the second configuration information comprising a second group of parameters on the BWP in the carrier, the second group of parameters comprising a second PCI; and performing transmission or reception based on the first group of parameters and performing transmission or reception based on the second group of parameters.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method and the instructions stored on the non-transitory, computer-readable medium.

The details of one or more implementations of the subject matter of this specification are set forth in the accompanying drawings and the description. Other features, aspects, and advantages of the subject matter will become apparent from the description, the drawings, and the claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4 shows a table including example groups of IDs configured for different TRPs;

FIG. 6 shows a table including example M-TRP scenarios;

In the figures, items in square brackets are optional, and dashed lines are for optional relations/transmissions.

DETAILED DESCRIPTION OF ILLUSTRATIVE EMBODIMENTS

In multiple-transmission-reception-points (M-TRP) communications, a UE, a transmission or a reception in a serving cell of a carrier or a bandwidth part (BWP, which may be seen as a portion of the carrier that the UE is currently operating on for the carrier) needs to adjust the transmission/reception timing and properties based on with which TRP the transmission/reception is. For example, if the uplink transmission timing for multiple TRPs over the carrier or BWP using the same TA of the TAG associated with the serving cell, it may cause inaccurate uplink timing of the UE in communication with a TRP not co-located (NCLed) with the serving cell of the UE, e.g., when the TRP is not synchronized with the serving cell, when the TRP and the serving cell have a non-ideal backhaul, and/or when the TRP is located far away from the serving cell, and a difference of propagation delays of the UE with the TRP and the serving cell cannot be neglected in adjusting uplink timing of the UE. The inaccurate uplink timing may negatively affect the UE's physical uplink control channel (PUCCH)/physical uplink shared channel (PUSCH) reliability, spectrum efficiency, and sounding accuracy for uplink/downlink multi-input multi-output (MIMO) channel state information (CSI) acquisition. Thus, the UE needs to be configured with separate TAGs for the serving cell and the NCLed TRP, and applies different TA when transmitting to different TRPs. Similarly, the UE's DL timing maintained via tracking loop should also be adjusted based on which TRP is transmitted to the UE. M-TRP allows the UE to receive from multiple TRPs on possibly overlapping time-frequency resources. Therefore, the UE may need to maintain multiple DL tracking loops, one for each NCLed TRP, and apply the associated FFT windows to receive DL transmissions from TRPs respectively. Consequently, the UL/DL signals/channels, or generally, radio resources, may need to be separated into groups, called resource groups (RGs), according to the NCLed TRPs.

Embodiments of the present disclosure provide example methods for M-TRP communications of a UE in a serving cell over a carrier/BWP of the serving cell, with separate RGs configured for different TRPs. Example methods described in some embodiments improve UL/DL transmission/reception qualities of the UE in the M-TRP communications. Some embodiments of the present disclosure also provide example methods for configuring the TRPs with separate RGs, and acquiring/obtaining/maintaining timings and association relationships of the separate TAGs by the UE. Details will be provided in the following.

Figure 1:
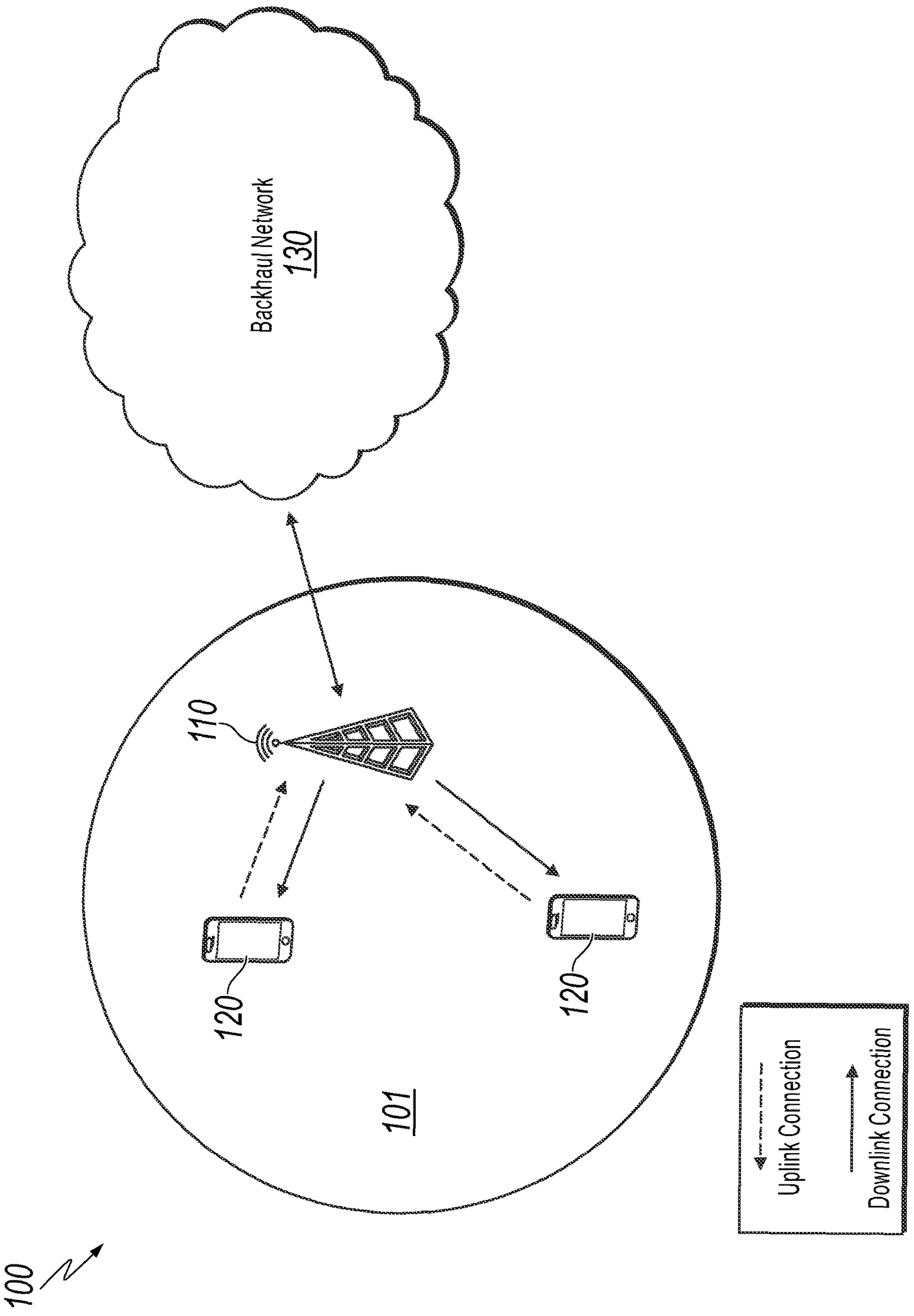
FIG. 1 shows an example wireless communication system.

FIG. 1 shows an example wireless communication system 100. As shown, the example wireless communication system 100 includes a base station 110 with coverage area 101. The base station 110 serves a plurality of user equipments (UEs), including UEs 120. Transmissions from the base station 110 to a UE 120 is referred to as a downlink (DL) transmission and occurs over a downlink channel (shown in FIG. 1 as a solid arrowed line), while transmissions from a UE 120 to the base station 110 is referred to as an uplink (UL) transmission and occurs over an uplink channel (shown in FIG. 1 as a dashed arrowed line). Data carried over the uplink/downlink connections may include data communicated between the UEs 120, as well as data communicated to/from a remote-end (not shown) by way of a backhaul network 130. Example uplink channels and signals include physical uplink shared channel (PUSCH), physical uplink control channel (PUCCH), an uplink sounding reference signal (SRS), or physical random access channel (PRACH). Services may be provided to the plurality of UEs 120 by service providers (not shown) connected to the base station 110 through the backhaul network 130, such as the Internet.

In an example communication system, there are several operating modes. In a cellular operating mode, communications to and from the plurality of UEs 120 go through the base station no. In device to device communications mode, such as proximity services (ProSe) operating mode, direct communication between UEs 120 is possible. As used herein, the term "base station" refers to any component (or collection of components) configured to provide wireless access to a network. Base stations may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, access nodes, access points, transmission points (TPs), transmission-reception points (TRPs), cells, carriers, macro cells, femtocells, pico cells, relays, customer premises equipment (CPE), the network side, the network, and so on. In the present disclosure, the terms "base station" and "TRP" are used interchangeably unless otherwise specified. As used herein, the term "UE" refers to any component (or collection of components) capable of establishing a wireless connection with a base station. UEs may also be commonly referred to as mobile stations, mobile devices, mobiles, terminals, user terminals, users, subscribers, stations, communication devices, CPEs, relays, Integrated Access and Backhaul (JAB) relays, and the like. It is noted that when relaying is used (based on relays, picos, CPEs, and so on), especially multi-hop relaying, the boundary between a controller and a node controlled by the controller may become blurry, and a dual node (e.g., either the controller or the node controlled by the controller) deployment where a first node that provides configuration or control information to a second node is considered to be the controller. Likewise, the concept of UL and DL transmissions can be extended as well.

A cell may include one or more bandwidth parts (BWPs) for UL or DL allocated for a UE. Each BWP may have its own BWP-specific numerology and configuration, such as the BWP's bandwidth. It is noted that not all BWPs need to be active at the same time for the UE. A cell may correspond to one carrier, and in some cases, multiple carriers. In some cases, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL, or simply UL) carrier which has an associated DL, and other carriers are called supplementary UL (SUL) carriers which do not have an associated DL. A cell, or a carrier, may be configured with slot or subframe formats comprised of DL and UL symbols, and that cell or carrier is seen as operating in a time division duplexed (TDD) mode. In general, for unpaired spectrum, the cells or carriers are in TDD mode, and for paired spectrum, the cells or carrier are in a frequency division duplexed (FDD) mode. A transmission time interval (TTI) generally corresponds to a subframe (e.g., in LTE) or a slot (e.g., in NR). Access nodes may provide wireless access in accordance with one or more wireless communication protocols, e.g., long term evolution (LTE), LTE advanced (LTE-A), 5G, 5G LTE, 5G NR, future 5G NR releases, 6G, High Speed Packet Access (HSPA), Wi-Fi 802.11a/b/g/n/ac, etc. While it is understood that communication systems may employ multiple access nodes (or base stations) capable of communicating with a number of UEs, only one access node, and two UEs are illustrated in FIG. 1 for simplicity.

Uplink timing may be controlled through timing advance (TA). TA is generally used to compensate for the propagation delay as signal travels between UEs and their serving network nodes, e.g., TRPs. Uplink timing of a UE may be measured by a TRP using an uplink signal or channel, e.g., PUSCH, PUCCH, PRACH or SRS, transmitted by the UE. A TA value may be determined and assigned to the UE based on the measurement. Timing advance commands may be transmitted, e.g., periodically, by the TRP, generally in a medium access control (MAC) command entity (CE). A timing advance command may include a TA value, based on which UE adjusts its uplink transmission timing to align with the timing at the network side. With proper TA values applied to UL transmissions from UEs in a cell, the UL transmissions of the UEs arrive at the base station at about the same time to facilitate detection and/or decoding of the UL transmissions from the multiple UEs.

Cells are grouped into different timing advance groups (TAGs). Cells having an uplink to which the same TA applies (e.g., cells hosted by the same transceiver) and using the same timing reference cell may be grouped in one TAG. Thus, cells grouped in the same TAG have the same TA. A cell may be assigned to a TAG via radio resource control (RRC) signaling. Thus, a cell is associated with a TAG. Each TAG may update its corresponding TA periodically. When receiving a TA command of a cell associate with a TAG, a UE adjusts its uplink transmission timing, e.g., for transmission of PUCCH, PUSCH, and/or SRS of the cell based on the received TA command of the associated TAG.

In 3GPP 5G NR Release 15 and 16 (R15/16), TAGs are cell based. In one carrier, there is only one serving cell, which is assigned with one TAG. In 3GPP R16, for M-TRP communications, a TRP not configured as a serving cell (e.g., the TRP1 214) is configured with the same TAG of its co-channel cell (e.g., the TRP0 212). Serving cell (PCell and/or SCell) is configured, in its IE ServingCellConfig, with a field tag-Id, which uniquely identifies a TAG. For all serving cells configured with the same tag-Id, they belong to the same TAG. The current framework of TA/TAG allows only a serving cell to be configured with a TA/TAG. In one carrier, there can be only one serving cell, and that cell is assigned with one TAG. With Rel-16 M-TRP design, for a TRP not co-located with a serving cell, Rel-16 does not have a separate TA for it and the UE applies the TA of the co-channel serving cell for this TRP. This works fine even for M-TRP scenarios provided that the multiple TRPs are not located far away from one another, are connected by fast backhaul, and are tightly synchronized. However, this has limited applications/deployment scenarios and needs to be enhanced.

When a UE is served by multiple TRPs in a serving cell associated with a TAG in a BWP over a carrier, the UE's uplink transmission timing for all the multiple TRPs in the BWP over the carrier is adjusted using the same TA of the TAG associated with the serving cell. Note that the multiple TRPs over the same carrier operate on the same BWP as specified in Rel-16. Using the same TA of a serving cell for communication with different TRPs may, in some cases, cause inaccurate uplink timing (uplink TA). This may negatively affect the UE's PUCCH/PUSCH reliability, spectrum efficiency, and sounding accuracy for uplink/downlink full multi-input multi-output (MIMO) channel state information (CSI) acquisition. Cyclic prefix (CP) may not be sufficient to cover the propagation delay differences, delay spread, and M-TRP sync inaccuracy.

Likewise, DL timing difference between the M-TRPs (especially inter-cell TRPs) may cause the CP or one FFT insufficient. How well the time/frequency synchronization between the M-TRPs may depend on the backhaul assumption. If ideal backhaul can be assumed, then likely the timing/frequency differences between the TRPs are negligible. Otherwise, non-negligible synchronization errors should be considered in the design. Regarding backhaul latency and coordination, generally, at least for inter-cell TRPs, ideal/fast backhaul cannot be assumed. Backhaul latency of a few milliseconds to a couple of tens of milliseconds and semi-static coordination should be considered in the design. Inter-TRP signal delay spread relative to the CP length should also be considered. Depending on the synchronization among the inter-cell TRPs and the relative distances of the TRPs to the UE, the possible assumptions are: The inter-cell signal delay spread is within the CP length but close to the CP length. Even though the inter-TRP signal delay spread is within the CP length, the arrive time difference from the TRPs may still be large.

Figure 2:
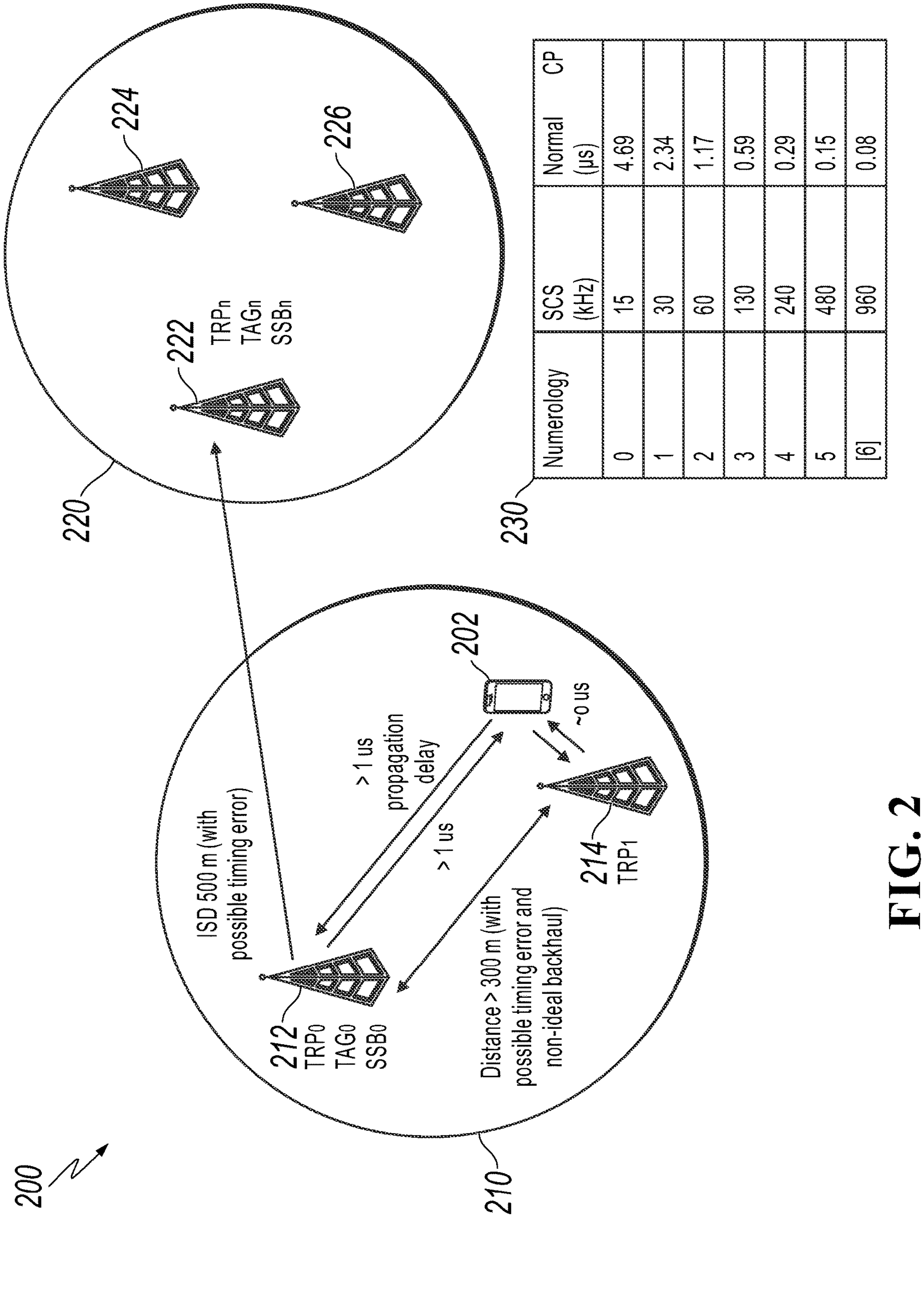
FIG. 2 shows an example wireless network.

FIG. 2 shows an example wireless network 200. In some cases, inaccurate uplink TA and downlink timing may occur within the network 200. As shown, the wireless network 200 includes a serving cell 210 (or base station) serving a UE 202 over a carrier. A TRP0 212 operating on a BWP over the carrier is co-located with the base station or cell 210, and broadcasts a PCID/SSB for the cell 210. The TRP0 212 transmits the SSB generated based on the PCID of the cell 210, and thus the PCID is transmitted/broadcast via transmission of the SSB. This is simplified as a TRP transmitting (or broadcasting) PCID/SSB in the following descriptions of the present disclosure for illustrative convenience. The SSB generated based on the PCID of the cell 210 is deemed to be associated with the cell 210 (or the PCID) or to be of the cell 210. A signal unassociated with the cell 210 indicates that the signal is not associated with the PCID of the cell, or not associated with a signal of the cell 210, directly or indirectly (see more detailed description based on quasi co-location below). The TRP0 212 may be configured to operate over one or more carriers/BWPs. The TRP0 212 may be referred to as a co-located TRP of the cell 210.

A TRP1 214 is located in the coverage area of the serving cell 210 (with a certain distance from the TRP0 212) and configured to cooperate with the TRP0 212 to serve UEs in the serving cell 210 over the carrier, i.e., providing multi-TRP (m-TRP, or M-TRP) communications over the carrier. The TRP1 214 is within the coverage range of the serving cell 210, assisting the serving cell 210, and not broadcasting the PCID/SSB for the cell 210, and may rely on the serving cell 210 for some functionalities (e.g., control plane functionalities), and thus it is considered as an intra-cell TRP of the cell 210. The TRP1 214 may be referred to as an intra-cell TRP of the cell 210 and co-channeled (i.e., serving over the same carrier) with the TRP0 212. The TRP1 214 may not be co-located with the cell 210 and does not broadcast any PCID or SSB. However, in some deployment, e.g., at frequency range 2 (FR2), the TRP1 214 may also broadcast the same PCID as the TRP0 212 does, and transmit a SSB as a reference for timing/beam (e.g., the SSB can be used by a UE for timing synchronization and initial beam acquisition for communication with the TRP1 214) but on a different SSB resource than the SSB transmitted by the TRP0 212.

The wireless network 200 also includes a TRPn 222 associated with a cell 220, which may be a neighbor cell of the serving cell 210. As a neighbor cell instead of a serving cell, the TRPn 222 generally does not serve UEs that are served by the cell 210, but may cause interference to the UEs served by cell 210, and it is not configured as a serving cell for the UEs served by the cell 210. This is different from a serving cell transmitting RRC/MAC/PHY layer signals to a UE and maintaining a connection to the UE. TRPs 224 and 226 are located in the coverage area of the cell 220 and configured to cooperate with the TRPn 222 to serve UEs of the cell 220 over one or more carriers supported by the TRPn 222. The UE 202 may be served by both the TRP0 212 and TRP1 214 over the same carrier, or over different carriers. Each of the cells 210 and 220 has an associated physical cell identifier (PCID, or PCI) and a synchronization signal block (SSB), based on which UEs synchronize with the respective cell.

As used herein, a TRP being co-located with another TRP (or base station, or cell) indicates that the two TRPs are at the same location and share the same set of antennas, and may, in some cases, even share the same antenna configuration (e.g., the same analog antenna beamforming). A co-located relation between two TRPs may be known to the network side but not be revealed to a UE, i.e., transparent to the UE. In some cases, it may be useful for the UE to know whether two received signals are from the same transmitter (or TRP, or antenna) or not, and QCL assumptions between RS ports of the transmitters may be introduced and signaled to the UE. A TRP being co-channeled with another TRP (or base station, or cell) indicates that they operate on the same carrier in frequency. A standalone TRP transmits a SSB/PCID of a cell (the signal on the SSB is generated based on the PCID), and thus a UE can find it during a cell search/initial access procedure. The UE connects to the standalone TRP/cell after that. A non-standalone TRP does not transmit a SSB/PCID, and thus a UE cannot find it during a cell search/initial access procedure. The UE cannot connect to the non-standalone TRP directly. Instead, the UE first connects to a standalone TRP/cell, and then the standalone TRP/cell signals the UE with information about the non-standalone TRP, so that the UE may communicate with the non-standalone TRP.

In this example, the cell 210 is assigned to TAG0 associated with the carrier. The UE 202 may have established a connection with the cell 210 through a random access procedure, and receives a TA command of the TAG0 from the TRP0 212. The TA value in the TA command is generally related to the distance between the TRP0 212 and the UE 202. The UE 202 then transmits uplink signals/channels over the carrier to both the TRP0 212 and TRP1 214 according the TA command, i.e., the same TA value, if they are in the same TAG as in Rel-16, i.e., if they are configured with the same TAG according to Rel-16. However, in a case where the TRP0 212 and TRP1 214 are located far away from each other, e.g., with a distance greater than 300 m, with non-ideal backhaul (e.g., with a backhaul latency of 10~20 ms or even longer, which may cause them not tightly synchronized with each other) between the TRPs 212 and 214, and the UE 202 is closer to the TRP1 214 (e.g., with nearly no propagation delay) than to the TRP0 212 (e.g., with a greater than 1 us propagation delay), uplink timing error may occur when the UE 202 communicates with the TRP1 214 using the TA value of the TAG0, which is assigned based on the TRP0 212. This is because the TA of the TAG0 is not well suited for TRP1 214 in view of the distance between the TRP1 214 and the TRP0 212, between the TRP1 214 and the UE 202, and between the TRP0 212 and the UE 202. In this case, there is a large propagation delay difference between the TRP1 214 and the UE 202, and between the TRP0 212 and the UE 202. Cyclic prefix (CP) may help mitigate the propagation delay difference to some extent, however, for higher subcarrier spacing (SCS), e.g., greater than 15 kHz, CP is short as shown in the table 230 in FIG. 2 and may not be sufficient to absorb such a large propagation delay difference, resulting in poor uplink timing alignment of the UE 202 with respect to the TRP1 214. Thus, it would be desirous to configure a separate TA value and hence a separate TAG for the UE 202 to communicate with the TRP1 214, although TRP0 212 and TRP1 214 are co-channeled in the same carrier of the serving cell 210 and the UE 202. That is, the TRP0 212 and the TRP1 214 may be associated with different TAGs, so that the UE 202 adjusts its uplink transmission timing differently for communications with the TRP0 212 and the TRP1 214, respectively. The UE 202 may need to perform a random access procedure to acquire the TA of a TAG associated with the TRP1 214 and synchronize with the TRP1 214 that does not have a standalone PCID, especially for SCS greater than 15 kHz. By doing so, more TRPs, especially TRPs far from the each other, can be added to the serving TRP pool for the UE 202 and well utilized by the UE 202. Likewise, in the DL, a first transmission from the TRP0 212 and a second transmission from the TRP1 214 may generally arrive at the UE at different timings. The timing differences may be more pronounced relative to the CP length when the two TRP0 212 and TRP1 214 are located far away from each other, with non-ideal backhaul (e.g., with a backhaul latency of 10~20 ms or even longer, which may cause them not tightly synchronized with each other) between the TRPs 212 and 214, not tightly synchronized between the TRPs 212 and 214, with long delay spread, with short OFDM symbol duration due to large SCS, and so on. One DL tracking loop/FFT window may be insufficient. The UE may need to maintain multiple FFT windows on the same carrier for NCLed TRPs. In addition, since the TRPs are not close to each other, the channel properties (e.g., Doppler shift, Doppler spread, average delay, delay spread, Spatial Rx parameter) between the UE 202 and the TRP0 212 may be quite different from the channel properties between the UE 202 and the TRP1 214, and hence to improve transmission/reception quality, the UE needs to apply different parameters accordingly. For this reason, the UE needs to be signaled with which TRP a transmission/reception is and then adapt.

In some cases, the network may also configure the TRPn 222 to serve the UE 202 over the same carrier, without configuring it as a secondary cell (SCell) of the UE 202, e.g., in order to provide increased network capacity. The TRPn 222 is an inter-cell TRP, as opposed to an intra-cell TRP. However, the TRPn 222 may be transparent to the UE 202. In this case, with Rel-16 design, the UE 202 may still use the TA of the TAG0 for uplink transmission to the TRPn 222, and the FFT window acquired from TRP0 212's RS/SSB for DL reception with the TRPn 222. However, if the TRPn 222 is located far away from the TRP0 212, e.g., greater than 500 meters, and/or if the timing of the TRPn 222 is not tightly synchronized to the TRP0 212, timing error occurs because the timing based on the TRP0 212 is not well suited for TRPn 222 in view of the distance/timing differences between the TRPn 222 and the TRP0 212, and between the TRPn 222 and the UE 202. It would also be desirous to configure a separate TAG, DL timing, and RG for the UE 202 to communicate with the TRPn 222 over the carrier. By doing so, more TRPs, including inter-cell TRPs, can be added to the serving TRP pool for the UE 202 and well utilized by the UE 202.

Some embodiments of the present disclosure provide example methods for M-TRP communications of a UE in a serving cell over the same carrier/BWP of the serving cell, with separate RGs configured for multiple TRPs in the M-TRP communications. The example methods provide a solution to the problem discussed above with respect to FIG. 2, which improves timing accuracy of the UE in the M-TRP communications. The example methods may be applied to intra-cell M-TRP communications, inter-cell M-TRP communications, or a mix of intra-cell and inter-cell M-TRP communications. In the intra-cell M-TRP communications, all of the multiple TRPs are located within the coverage area of the current serving cell of the UE. Such a TRP of the multiple TRPs may be referred to as a co-cell (or intra-cell) TRP of the serving cell in the disclosure for illustrative convenience, e.g., TRP1 214, and if it also serves the UE by transmitting/receiving data with the UE, it may be called as an intra-cell serving TRP or simply intra-cell TRP of the UE. In the inter-cell M-TRP communications, one or more TRPs may be from another cell different from the serving cell of the UE, and are referred to as inter-cell serving TRPs (or simply inter-cell TRPs) in the disclosure for illustrative convenience. A TRP acting as the serving cell of the UE and broadcasting a PCID/SSB of the serving cell may be referred to as the serving cell of the UE in the disclosure for illustrative convenience, e.g., TRP0 212 broadcasting SSB0 of the cell 210 may be referred to as the "cell", "serving cell", or "base station" for the UE 202. The TRP is thus associated with the serving cell of the UE. Using FIG. 2 as an example, the TRPs that serve the UE 202 may be referred to as serving TRPs of the UE 202, and the TRPs may be intra-cell (e.g., TRP1 214) and/or inter-cell (e.g., TRPn 222), co-located with the cell (e.g., TRP0 212), or non-co-located with the cell (e.g., TRP1 214, and TRPn 222). The intra-cell TRP1 214 may or may not broadcast the PCID/SSB of the serving cell of the UE. In some deployment, e.g., at FR2, the TRP1 214 may also broadcast the same PCID as the TRP0 212 does, and transmit SSB as a reference for timing/beam but on a different SSB resource than the TRP0 212. The inter-cell TRPn 222 may or may not broadcast a PCID/SSB of a cell, where the inter-cell TRPn 222 is located in a coverage area of the cell. Each TRP may have one or more carriers. For M-TRP scenarios, a UE may also operate with carrier aggregation, i.e., it communicates over multiple carriers with the TRP0 212, and on each of these carriers, the UE may also be served by one or more intra-cell TRPs, such as the TRP1 214 and/or inter-cell TRPs, such as the TRPn 222. That is, the UE may also communicate with those TRPs on multiple carriers.

In some embodiments, in one carrier, there is one serving cell, but there are multiple TAGs, RGs, SSBs, and/or PCIDs configured for a UE. A serving TRP of the UE, e.g., TRP0 212, may be associated with a TAG (or a co-channel TAG, e.g., TAG0) and a RG (or a co-channel RG, e.g., RG0), e.g., using RRC signaling as conventionally configured, if it is associated with the serving cell 210 of the UE, as discussed above. In what follows, a TA may be seen as a (an optional) parameter associated with a RG, so only RGs are described which also apply to TAG (unless otherwise specified). In an embodiment, a group of UL signals/channels form a UL RG and a group of DL signals/channels form a DL RG, i.e., the RGs are separate for UL and DL. In an embodiment, a group of UL/DL signals/channels form a RG, i.e., no separate RGs for UL and DL. In an embodiment, one UL RG is associated with one DL RG and vice versa. In an embodiment, one UL RG is associated with multiple DL RGs. In an embodiment, one DL RG is associated with multiple UL RGs. In an embodiment, a separate TAG is not configured but a separate RG is configured, and each RG is associated with a TA, which is an alternative approach to configure a separate TAG. In an embodiment, a separate TAG is not configured but a separate UL RG is configured, and each UL RG is associated with a TA. In an embodiment, a separate TAG is configured in parallel to a separate RG, and each TAG is associated with a RG. An intra-cell or inter-cell serving TRP not configured as a serving cell or not co-located with a serving cell of the UE, e.g., TRP1 214, or TRPn 222, may be associated with a separate RG. For a serving TRP not transmitting a SSB, e.g., the TRP1 214, a tracking reference signal (TRS), also referred to as a channel state information-reference signal (CSI-RS) for tracking, of such a serving TRP may be used to form a separate RG, even when there is already a co-channel RG associated with the serving cell, e.g., the cell 210. Uplink/DL signals of the UE that is quasi-co-located (QCLed) to the TRS are associated with the separate RG. Thus, the TRS may be used to form the separate RG. The TRP0 212 may operate on more than one carrier, and the carriers not far away from each other in the frequency domain may belong to the same RG, i.e., RG0. TRP1 214 may also operate on more than one carrier, each of which is co-channelled with one carrier on the TRP0 212, and each of which has a TRS transmitted. All uplink/DL signals of the UE that is quasi co-located (QCLed) to these TRSs of the TRP1 214 are associated with the separate RG. In general, TRSs transmitted from the same/co-located TRP on a same frequency band can be used to define a RG, and TRSs transmitted from non-co-located TRPs may be associated with different RGs. TRP/TRS-specific scrambling ID(s) may be needed for PUSCH and for demodulation reference signal (DMRS) of PUSCH communicated during the random access procedure, as well as TRP/TRS-specific scrambling ID(s) for DMRS of PDSCH, TRP/TRS-specific scrambling ID(s) for physical downlink shared channel (PDSCH), TRP/TRS-specific scrambling ID(s) for DMRS of physical downlink control channel (PDCCH), and TRP/TRS-specific scrambling ID(s) for PDCCH.

The quasi co-location (QCL) types corresponding to each DL RS (more specifically, the port(s) or antenna port(s) of the DL RS) are given by the higher layer parameter qcl-Type in QCL-Info and may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. The QCL types may be configured/indicated in transmission configuration indication (TCI) states for a RS. The QCL assumptions are mainly used for DL RS, but can be generalized for UL RS if the association via pathloss RS and spatial relation are specified. The QCL assumption may be specified as: {RS1: QCL Type C to RS2}, {RS1: QCL Type C to RS2 and QCL Type D to RS3}. Then RS1 (destination RS) derives the properties specified according to the QCL types from the associated (i.e., source) RSs (e.g., RS2). Note that the source RS may be a SSB. Note also that the source RS and destination RS may be on the same carrier or different carriers (i.e., cross-carrier QCL).

For an inter-cell serving TRP, e.g., TRPn 222, a SSB of the inter-cell serving TRP may be configured to the UE but not as a SCell of the UE (i.e., the cell associated with the SSB of the inter-cell serving TRP is not one of the serving cells of the UE). A TRS of the inter-cell serving TRP may be used to form a separate RG, even when there is already a co-channel RG associated with the serving cell, e.g., the cell 210. TRP-specific scrambling ID(s) may be needed for PUSCH and for DMRS of PUSCH communicated during the random access procedure, as well as TRP/TRS-specific scrambling ID(s) for DMRS of PDSCH, TRP/TRS-specific scrambling ID(s) for PDSCH, TRP/TRS-specific scrambling ID(s) for DMRS of PDCCH, and TRP/TRS-specific scrambling ID(s) for PDCCH.

A PDCCH may be used to indicate, via an ID or quasi co-location (QCL) relation and/or a default relation, which serving TRP, e.g., the TRP1 214 or the TRPn 222, that a UE needs to receive a PDSCH from or transmit a PUSCH to. Each TRP may be associated with an ID, such as a control resource set (CORESET) pool ID, so that, for example, a PDCCH received on a CORESET with a CORESET pool ID 0 indicates a PUSCH transmission to a TRP associated with the ID 0. In another example, a PDCCH received with a QCL relation/TCI state linking to a SSB or a TRS indicates a PUSCH transmission to a TRP associated with that SSB or TRS.

Taking FIG. 2 as an example, the UE 202 may be synchronized with the TRP0 212 that is the serving cell 210 of the UE 202 over a carrier, and receives a TA command for a first TAG or a first RG, i.e., TAG0 or RG0, that includes the serving cell 210. Thus, the UE 202 is configured with TAG0 or RG0 for communication with the TRP0 212. A PDCCH order may be transmitted, by the TRP0 212 or the TRP1 214, to the UE 202, including information about random access parameters and triggering/instructing the UE 202 to perform a random access procedure with the TRP1 214, when the base station for the serving cell 210 decides to connect the UE with TRP1 214, or when the base station for the serving cell 210 finds that the TA to the TRP1 214 is lost or inaccurate. The UE 202 may then transmit a RACH preamble to the TRP1 214, and receive, e.g., in a random access response (RAR), a TA command of a second TAG or RG, e.g., TAG1 or RG1, which is associated with the carrier and includes the TRP1 214. Thus, the UE 202 is configured with TAG1 or RG1 for communication with the TRP1 214. A PDCCH order may also be transmitted, by the TRP0 212 or the TRPn 222, to the UE 202, triggering the UE 202 to perform a random access procedure with the TRPn 222. The UE 202 may transmit a RACH preamble to the TRPn 222, and receive a TA command of a third TAG or RG, e.g., TAG2 or RG2, which is associated with the carrier and includes the TRPn 222. Thus, the UE 202 is configured with TAG2 or RG2 for communication with the TRPn 222. In an embodiment, each of the TAGs or RGs may be associated with a TAG ID or RG ID uniquely identifying a respective TAG or RG. In an embodiment, each of the TAGs may be associated with a TAG ID uniquely identifying a respective TAG, and the RGs do not have RG ID but are one-to-one associated with the TAGs. After receipt of the TAs of the different TAGs or RGs, i.e., TAG0, TAG1 and TAG2, or RG0, RG1 and RG2, the UE 202 may perform uplink transmission over the carrier with the TRP0 212, TRP1 214, and TRPn 222 according to uplink transmission timing adjusted based on their respective TAs. A TA of an associated TAG or RG may be updated periodically, e.g., about every 20 to 50 ms, for each TAG or RG, and the updated TA may then be sent to the UE 202 in a TA command. The TA command may be carried in an MAC CE. The TA may be updated by the network by measuring an uplink transmission from the UE 202, e.g., SRS. The UE 202 may adjust its uplink transmission timing for a TAG or RG according to the updated TA of the TAG or RG. The UE 202 may thus be served by two or more of the TRP0 212, TRP1 214, and TRPn 222 over the carrier, with each of the TRP0 212, TRP1 214, and TRPn 222 associated with a separate TAG or RG. The separate TAG or RG enables the UE 202 to more accurately adjust its uplink transmission timing with a TRP of the separate TAG or RG.

The UE 202 may receive scheduling information scheduling uplink transmission of the UE with a TRP on a carrier according to a RG associated with the TRP. In some embodiments, the UE 202 may receive first configuration information of the carrier of the serving cell 210 via a RRC configuration signaling. The first configuration information may include/indicate an association between a first group of uplink signals and channels to be transmitted on the carrier by the UE in the serving cell 210 and the RG0, and the RG0 is associated with a first TA value. That is, the first configuration information of the carrier indicates that transmission of the first group of uplink signals and channels by the UE is according to the first TA value of the RG0. The first configuration information may be transmitted by the TRP0 212 to the UE 202. The UE 202 may also receive second configuration information of the carrier, which includes/indicates an association between a second group of uplink signals and channels to be transmitted on the carrier by the UE and the uplink RG1, and the RG1 is associated with a second TA value. That is, the second configuration information of the carrier indicates that transmission of the second group of uplink signals and channels by the UE is according to the second TA value of the RG1. The second configuration information may be transmitted by the TRP0 212 or the TRP1 214 to the UE 202. Similarly, the UE 202 may also receive third configuration information of the carrier, which includes/indicates an association of a third group of uplink signals and channels on the carrier with the uplink RG2, and the RG2 is associated with a third TA value. That is, the third configuration information of the carrier indicates that transmission of the third group of uplink signals and channels by the UE is according to the third TA value of the RG2. The third configuration information may be transmitted by the TRP0 212 or the TRPn 222 to the UE 202. The first, second, and third configuration information of the carrier may be transmitted by the TRP0 212 in one message or separate messages. The UE 202 may then transmit, to the TRP0 212, a UL signal or a UL channel in the first group of UL signals and channels according to the first TA value. The UE 202 may transmit, to the TRP1 214, a UL signal or a UL channel in the second group of UL signals and channels according to the second TA value. The UE 202 may transmit, to the TRPn 222, a UL signal or a UL channel in the third group of UL signals and channels according to the third TA value. The first, second and third groups of UL signals and channels may be configured with a same subcarrier spacing (SCS) within a same BWP. Both the second and the third groups may be configured, or only one of the groups may be configured.

The serving cell 210 is associated with a first PCID and a first SSB. A UL signal or channel in the first group of UL signals and channels may be quasi-co-located (QCLed) to the first SSB, or QCLed to a downlink/uplink reference signal that is QCLed to the first SSB, or is configured with a pathloss RS that is the first SSB or is QCLed to the first SSB, or is configured with a spatial relation RS that is the first SSB or is QCLed to the first SSB. In an embodiment, all UL signal or channel in the first group of UL signals and channels are associated with the first RG.

A UL signal or channel in the second group of UL signals and channels may be QCLed to a TRS of the TRP1 214, or to a downlink/uplink reference signal that is QCLed to the TRS of the TRP1 214, or is configured with a pathloss RS that is the TRS or is QCLed to the TRS of the TRP1 214. In an embodiment, all UL signal or channel in the second group of UL signals and channels are associated with the second TAG. In an embodiment of network deployment, a TRS of the TRP1 214 may be "approximately" QCLed to the first SSB of the serving cell or a TRS of the first SSB, even though the TRP1 214 is not co-located with the TRP0 212 broadcasting the first SSB/PCID, which generally requires that the TRPs are not far away from each other, operate in frequency range 1 (FR1), and serve UEs that do not have high mobility. Still a separate TAG from the TAG for the first SSB/PCID may be beneficial. In an embodiment of network deployment, the TRP1 214 may broadcast the first PCID on a SSB resource different from the first SSB transmitted by TRP0 212, even though the TRP1 214 is not co-located with the TRP broadcasting the first SSB/PCID. A separate RG from the RG for the first SSB/PCID may be configured for the TRP1 214. The SSBs associated with the same PCID but occupy different SSB resources within one SSB burst in FR2 are distinguished via SSB index, and hence each SSB index may be used to define a separate RG if the SSBs with different SSB indexes are transmitted from non-co-located TRPs.

A UL signal or channel in the third group of UL signals and channels may be QCLed to a TRS of the TRPn 222, QCLed to a second SSB associated with a neighbor cell that has a second PCID different than the first PCID, e.g., the cell 220, or QCLed to a PCID of a cell other than serving cells of the UE 202, or QCLed to a downlink/uplink reference signal that is QCLed to the TRS of the TRPn 222 or the second SSB, or configured with a pathloss RS that is the TRS of the TRPn 222 or the second SSB, or that is QCLed to the TRS of the TRPn 222 or the second SSB. In an embodiment, all UL signal or channel in the third group of UL signals and channels are associated with the third RG.

As discussed above, the example methods associate serving TRPs, which are QCLed to a non-serving cell's SSB directly/indirectly, or which are not QCLed to a serving cell's SSB, or not co-located with a serving cell's TRP(s) transmitting the serving cell's SSB, with RGs separate from the serving cell's TAG, and a UE also needs to perform random access with the serving TRPs to obtain separate TAs. As used herein, a first RS may be QCLed to a second RS/SSB directly, for example, the UE is signaled with a QCL assumption for the first RS that refers to the second RS/SSB for a QCL type, e.g., the UE receives a QCL assumption indicating {the first RS: QCL Type C to the second RS}. A first RS may be QCLed to a second RS/SSB indirectly, for example, the UE is signaled with a QCL assumption for the first RS that refers to one or more RS/SSB, which are further referred to the second RS/SSB for QCL, via one or more QCL assumptions in a concatenated manner, e.g., the UE receives a QCL assumption indicating {the first RS: QCL Type C to a third RS}, {the third RS: QCL Type A to a fourth RS}, and {the fourth RS: QCL Type C to the second RS}. In other words, one QCL assumption defines a relationship/link between a source RS and a destination RS, and multiple QCL assumptions may define a chain of relationships/links that associate a RS, directly using one link or indirectly using multiple links, to another RS/SSB.

For example, a PDCCH DMRS may be configured/indicated as QCLed to the first SSB of the serving cell or a TRS of the non-serving cell, and an ID is configured for the PDCCH DMRS. Then the UE may receive the PDCCH DMRS with the configured ID, and the DMRS and ID are associated with the TRP of the non-serving cell. The QCL assumptions/relations associate or link all the involved RS, the channels associated with the RS, and IDs associated with the RS/channels, to the QCLed SSB (directly or indirectly via other UL/DL RS), and serve as an implicit way to group the signals/channels/IDs separately according to the TRPs into RGs.

Figure 3:
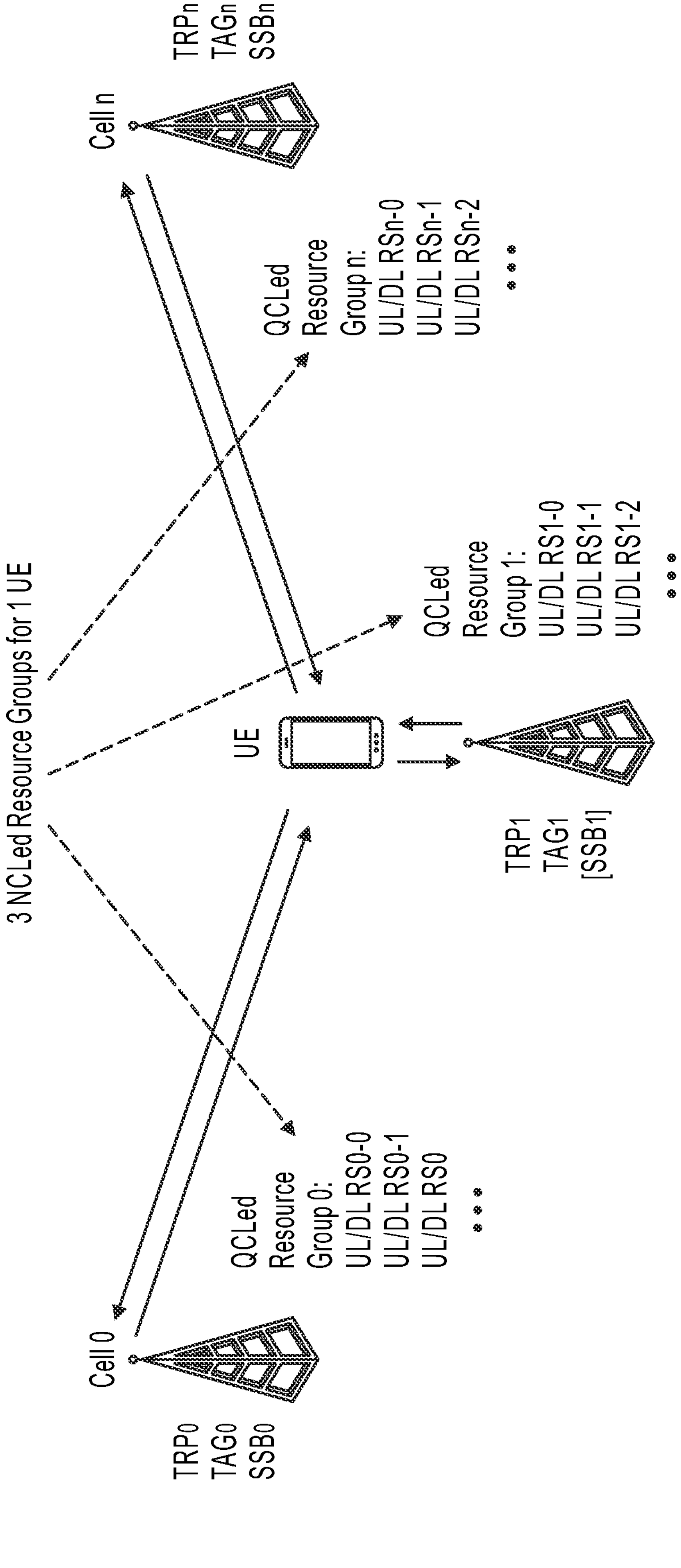
FIG. 3 shows an example of RGs.

FIG. 3 shows an example of the RGs. In each RG, there are a group of signals comprising RSs and possibly SSB. The RGs are for each of the NCLed TRPs, which is transparent to the UE. The UE is configured with the RGs, and within each RG, the signals are QCLed directly or indirectly with each other. The UE shall not assume QCL relationship across the RGs. In general, each RG should include at least one of a SSB and a TRS. The QCL relationship may be generalized to also include pathloss RS relationship and spatial relationship. Any and all QCL types may be adopted to define a RG.

FIG. 4 shows a table 400 including example groups of IDs configured for different TRPs. The table 400 shows three groups of IDs, i.e., a first group of IDs for a first group of signals for a first TRP0 associated with a RG0 (and possibly a first beam), a second group of IDs for a second group of signals for a second TRP1 associated with a RG1 (and possibly a second beam), and a third group of IDs for a third group of signals for a third TRP2 associated with a RG2 (and possibly a third beam). Each group of IDs includes ID1-ID7. ID1 of these groups is supported in R15/16 for PL CSI-RS. R15/16 generally uses a PCID for ID2-ID7, and requires fast backhaul. Each group of IDs may be pre-configured and re-configured for an associated RG. A UE may transmit or receive with a TRP using a group of IDs associated with a RG of the TRP.

A UE may receive a physical downlink control channel (PDCCH). The PDCCH may be associated with a control resource set (CORESET) with a first CORESET pool index, or has a DMRS that is configured to be QCLed to a SSB or a TRS QCLed to the SSB. The DL RS may be QCLed to the SSB, may be the SSB, or may be a CSI-RS QCLed to the SSB or the TRS, or may be a TRS QCLed to the SSB. If the SSB or TRS is associated with a serving cell of the UE, e.g., the cell 210 in FIG. 2, the UE may transmit/receive with the serving cell, and the signals/channels/IDs for the RG of the serving cell over the carrier are used. In this case, the PDCCH may be transmitted by the serving cell of the UE via a TRP associated with the serving cell, such as the TRP0 212.

In some embodiments, the UE receives DL transmissions in an M-TRP deployment scenario. As noted above, many of the UL related operations depend on DL operations. The following deployment scenario related assumptions are considered. DL timing difference between the M-TRPs (especially inter-cell TRPs) may cause the CP or one FFT insufficient. How well the time/frequency synchronization between the M-TRPs is may depend on the backhaul assumption. If ideal backhaul can be assumed, then likely the timing/frequency differences between the TRPs are negligible. Otherwise, non-negligible synchronization errors should be considered in the design. Regarding backhaul latency and coordination, generally, at least for inter-cell TRPs, ideal/fast backhaul cannot be assumed. Backhaul latency of a few milliseconds to a couple of tens of milliseconds and semi-static coordination should be considered in the design. Inter-TRP signal delay spread relative to the CP length should also be considered. Depending on the synchronization among the inter-cell TRPs and the relative distances of the TRPs to the UE, the possible assumptions are: 1) The inter-cell signal delay spread is within the CP length but close to the CP length, i.e., even though the inter-TRP signal delay spread is within the CP length, the arrive time difference from the TRPs may still be large. The UE may still need to have the capability of supporting multiple tracking loops and FFT windows in DL in order to improve its signal reception performance. 2) The inter-cell signal delay spread is longer than the CP length, then multiple tracking loops and FFT windows are needed in this case. In some embodiments, multiple tracking loops and FFT windows are used on the same carrier on the same OFDM symbol for a UE to receive PDSCH/PDCCH from multi-TRPs. The standards may specify UE assumptions/behavior under multiple QCL/TCI states so that the UE can correctly use the tracking loop and FFT window to receive a PDCCH/PDSCH. The UE may maintain multiple FFT windows (i.e., DL fine timing synchronization), and apply the FFT windows on the same carrier on the same OFDM symbol based on the multiple TCI states for DL receptions from multiple TRPs, in which a first fine timing/first FFT window is associated with a first TCI state, a first PDCCH/PDSCH, and a first TRP, and a second fine timing/first FFT window is associated with a second TCI state, a second PDCCH/PDSCH, and a second TRP. On the other hand, only the minimum UE assumptions may be specified, such as “the UE assumes multiple QCL assumptions that respectively link to multiple SSBs (directly or indirectly through one or more RS) on the same carrier on the same OFDM symbol based on the multiple TCI states for DL receptions” or “the UE shall have capability to receive simultaneously transmissions associated with more than one RG, wherein each RG may be associated with a DL time and frequency synchronization”. Note that in the prior art, on the same time-frequency resources the QCL assumptions link to at most one SSB directly/indirectly, but here the QCL assumptions link to more than one SSB directly/indirectly to support more general M-TRP operations. The UE can link PDSCH/PDCCH as well as other transmissions/receptions to the inter-cell TRP via the QCL relation linking to the non-serving SSB, and hence the CORESET pool indexes may not need to be explicitly configured in this case. A CORESET configured with TCI state(s) including QCL to the serving SSB directly or indirectly is for the TRP associated with the serving SSB, i.e., effectively assigned with CORESETPoolIndex 0, and a CORESET configured with TCI state(s) including QCL to the non-serving SSB directly or indirectly is for the TRP associated with the non-serving SSB, i.e., effectively assigned with CORESETPoolIndex 1. In an embodiment, the CORESETPoolIndex is used to identify each RG. The UE does not expect a CORESET configured with TCI state(s) including QCL to both the serving SSB and the non-serving SSB, directly or indirectly. To support reception with multiple tracking loops and FFT windows, the UE needs to have the capability to receive inter-cell multi-TRP with delay spread comparable or longer than the CP length, which may require some duplicated hardware. This is in parallel to UL transmissions with the new UE behavior and capability to acquire, maintain, and apply multiple TAs. These capabilities are generally similar to UE CA capability but the aggregation of additional radio resources are on the same carrier, and can be used jointly with CA capabilities, i.e., a UE may support 5 component carriers (CCs), and on each CC it may support 2 TRPs, then the UE needs to have the capability to aggregate 10 PDSCH transmissions simultaneously. All DL signals/channels (PDSCH/PDCCH/DMRS/CSI-RS/CSI-IM/PTRS/etc.) should be QCLed to a TRS/SSB directly or indirectly, and similarly, all UL signals/channels (PUCCH/PUSCH/SRS/DMRS/PTRS/PRACH) should also be QCLed (or via spatial relation, via pathloss RS relation, etc.) to a TRS/SSB and belong to the TAG associated with that TRS/SSB.

Figure 5:
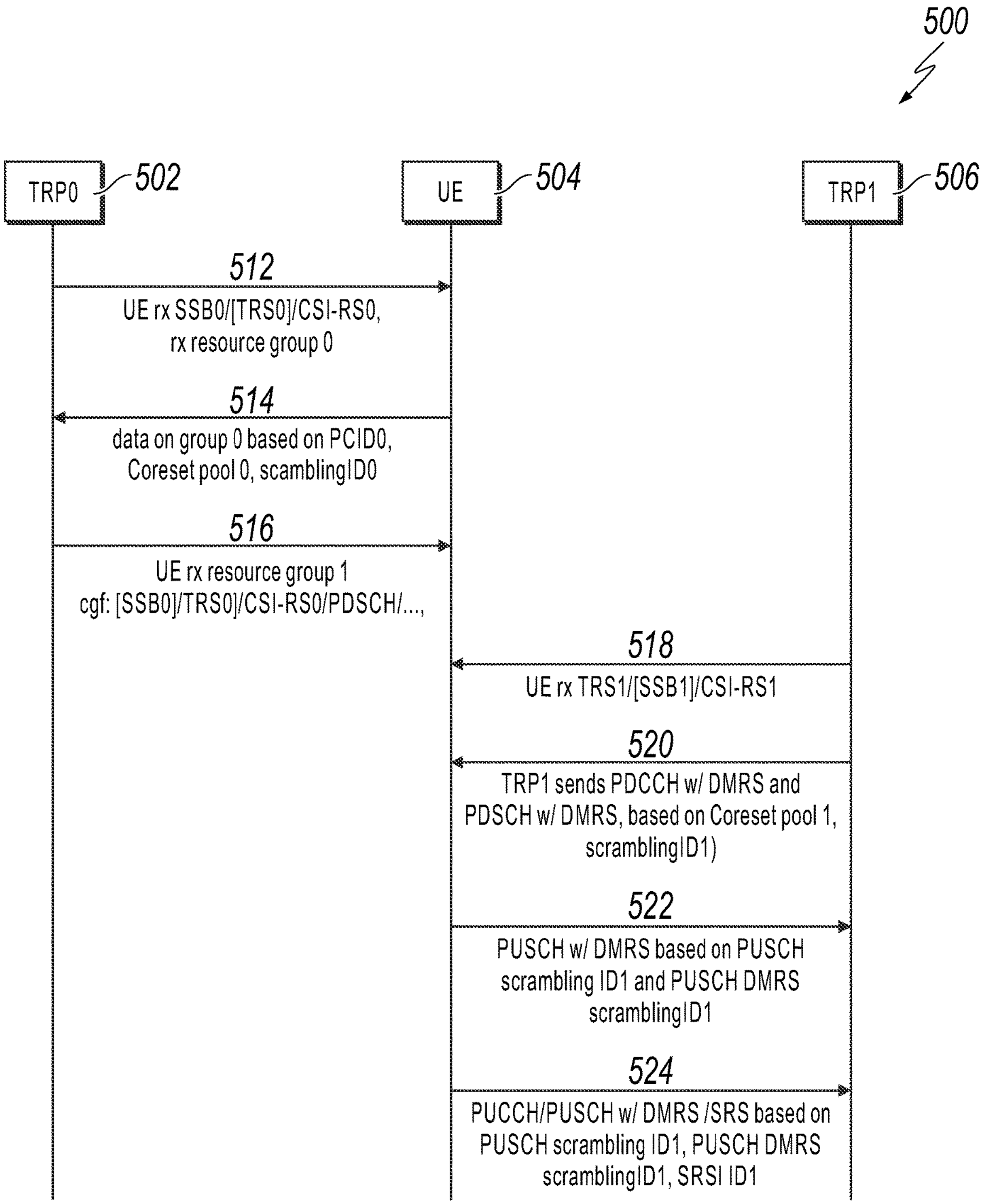
FIG. 5 shows an example method of exchanging and processing messages in an M-DCI M-TRP communication.

FIG. 5 shows an example method 500 of exchanging and processing messages. In some cases, the example method 500 can be performed by devices participating in an M-DCI M-TRP communication on one carrier. As shown, example method 500 is performed by a TRP0 502, a UE 504, and a TRP1 506. The TRP0 502 is configured as a serving cell (broadcasting SSB0/PCID0 of the serving cell) of the UE 504 over a carrier. The TRP1 506 is a co-channel serving TRP of the UE 504. Generally, the serving cell broadcasts a SSB0/PCID0 of the serving cell. In some embodiments, for intra-band carrier aggregation (CA), a SCell may not transmit a SSB, and the signals/channels for the SCell are QCLed to a SSB of another serving cell on another carrier within the same frequency band of the same TRP. For example, the UE 504 may be configured with two (2) carriers (e.g., carriers A and B) within a band, on carrier A. The UE 504 may be configured with a cell A with a first SSB, and on carrier B, the UE is configured with a cell B without SSB (e.g., specified by higher layer parameter scellWithoutSSB). The signals/channels for the cells are transmitted/received by the TRP0 502. The UE 504 receives the first SSB on cell A but not on cell B, and the signals/channels for the cell B are QCLed directly/indirectly with the first SSB on the cell A. Likewise, on the TRP1 506, TRS may not be transmitted on the carrier (e.g., first carrier) but may be transmitted on a second (different) carrier that the TRP1 506 is also operating on and configured to the UE 504, and signals/channels to/from the TRP1 506 on the first carrier may be QCLed directly/indirectly with the TRS transmitted on the second carrier. The SSB0 may be transmitted on the carrier or on a different carrier, and the TRS0 may be transmitted on the carrier or on a different carrier, and other signals/channels may be QCLed to the SSB0 and/or TRS0.

The UE 504 may receive a TRS1 or SSB1 from the TRP1 506, and also receive configuration information of a separate RG from the TRP1 506 (step 518). The SSB1 may be transmitted on the carrier or on a different carrier (similar to the above scellWithoutSSB description for the TRP0 502), and the TRS1 may be transmitted on the carrier or on a different carrier (similar to the above description for the TRP1 506 without transmitting a TRS on the carrier), and other signals/channels may be QCLed to the SSB1 and/or TRS1.

The UE 504 may monitor CSI-RSs (CSI-RS1) with a CSI-RS ID (CSI-RS ID1) from the TRP1 506. The CSI-RS1 may be scrambled using the CSI-RS ID1. The UE 504 receives a PDCCH order (DCI1 PDCCH order) associated with a CORESET pool (Coreset pool 1) (step 520). The PDCCH may have an associated DMRS and indicate a PDSCH with an associated DMRS, which are transmitted based on the Coreset pool 1 and using a scrambling ID1 of the TR 506 (scramblingID1). PUSCH may have an associated DMRS. At step 522, the PUSCH is scrambled using a PUSCH scrambling ID (PUSCH scramblingID1), and the DMRS is scrambled using a PUSCH DMRS scrambling ID (PUSCH DMRS scramblingID1). At step 524, the UE 504 may transmit to the TR1 506, one or more PUCCHs (scrambled using the PUCCH scramblingID1), PUSCHs (scrambled using the PUSCH scramblingID1) with associated DMRS (scrambled using the PUSCH DMRS scramblingID1), and/or SRS (scrambled using a SRS ID1). In general, the RG0 parameters (e.g., IDs, timings) and RSs (e.g., TRS, CSI-RS, DMRS) and channels (e.g., PDSCH, PUSCH, etc.) are used to communicate with TRP0 502, and the RG1 parameters (e.g., IDs, timings) and RSs (e.g., TRS, CSI-RS, DMRS) and channels (e.g., PDSCH, PUSCH, etc.) are used to communicate with TRP1 506.

The PUSCH scramblingID may be called dataScramblingIdentityPUSCH, and for the M-TRPs they may be called dataScramblingIdentityPUSCH and dataScramblingIdentityPUSCH2 (or AdditionaldataScramblingIdentityPUSCH). In addition, if a higher layer signaling index per CORESET is configured such as CORESETPoolIndex is configured, dataScramblingIdentityPUSCH is associated with a higher layer signaling index per CORESET and is applied to the PUSCH scheduled with a DCI detected on a CORESET with the same higher layer index, e.g., dataScramblingIdentityPUSCH is associated with CORESETPoolIndex being o (or no explicit index), and AdditionaldataScramblingIdentityPUSCH is associated with CORESETPoolIndex being 1. The DMRS for the PUSCH may be done likewise, which generally have another set of scrambling identities and now need to be increased for M-TRP PUSCH DMRS.

Table 1 below shows numbers of PCID per carrier, for existing 3GPP standards (Releases) and new embodiments. For all existing configurations, at most 1 PCID/RG/TAG configuration can be allowed for a carrier, even if multiple TRPs may be on the carrier. With the embodiment designs, more than 1 PCID/RG/TAG configuration may be allowed for a carrier.

TABLE 1

| | # PCIDs/ carrier | # RGs/ carrier |
|---|---|---|
| R15 | 1 | 1 |
| R16 intra-cell M-TRP | 1 | 1 |
| CA | 1 | 1 |
| DC | 1 | 1 |
| Embodiment intra-cell M-TRP | 1 | 2 |
| Embodiment inter-cell M-TRP | 2 | 2 |

FIG. 6 shows a table 600 including example M-TRP scenarios for RGs and observation as a result of analysis of the scenarios. In this example, "Cell w/ SSB" refers to a standalone cell with a standalone SSB/PCID. A TRP of the cell broadcasts the SSB/PCID. "TRP w/o SSB" refers to a non-standalone TRP without a standalone SSB/PCID, or non-standalone TRP that can share a SSB/PCID with a standalone cell. The TRP itself does not transmit a SSB/PCID. "Tightly synched" refers to two TRPs synchronized with a timing error of at most a few percent of a CP length, i.e., generally negligible. Table 600 shows 8 example scenarios (e.g., scenarios 1-8) including situations such as cell and TRPs (cell/TRPs) that are tightly synchronized, cell/TRPs that are not tightly synchronized, cell/TRPs with fast backhaul, cell/TRPs with no fast backhaul, cell/TRPs with single-downlink control information (S-DCI) or multi-DCI (M-DCI). The analysis shows that at least for large cells or not-tightly synched cell/TRPs, separate RGs are desirous. In all the scenarios, separate RGs may be configured for separate TRPs, for better UL/DL transmission quality. RGs may not be cell-based, but TRP-based, e.g., a cell with an associated SSB may be configured as a TRP, not as a serving cell.

Figure 7:
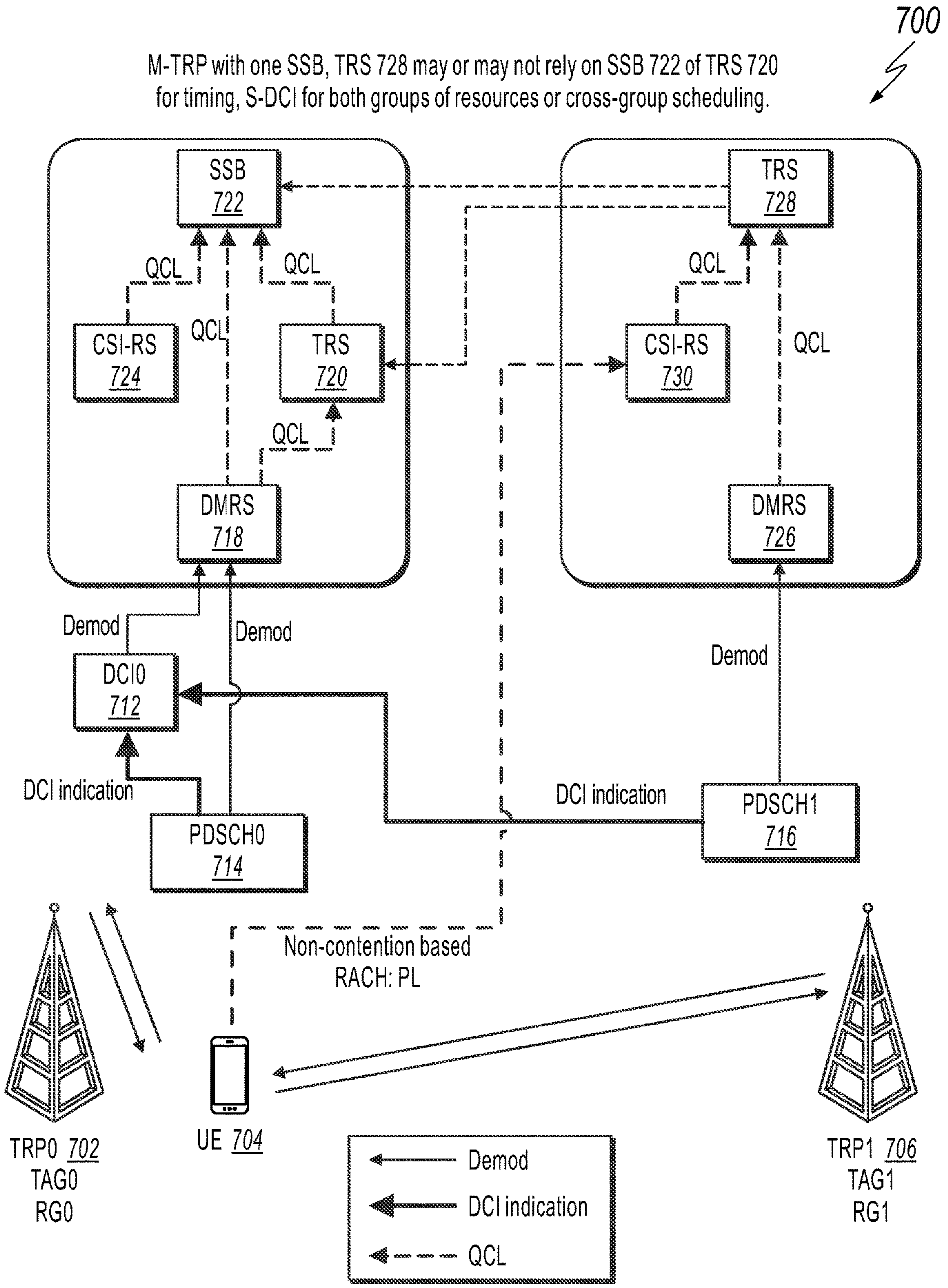
FIG. 7 shows a diagram illustrating an example scenario in FIG. 6.

FIG. 7 shows a diagram 700 illustrating the example scenario 1 in Table 600 of FIG. 6. The diagram 700 shows a TRP0 702 configured as a serving cell of a UE 704 over a carrier. A TRP1 706 not configured as a serving cell of the UE 704 over the same carrier is non-co-located with the TRP0 702. The TRP0 702 and the TRP1 706 provide M-TRP communication services to UEs in the serving cell. In this example, the TRP0 702 and the TRP1 706 are synchronized with each other and have fast backhaul between the TRP0 702 and the TRP1 706. Separate RGs (i.e., RG0 and RG1) may be configured for the TRP0 702 and the TRP1 706. The resulting benefits include improved UL/DL spectrum efficiency (SE). Using TA acquisition as an example because it involves almost all signals/channels in UL/DL. The TRP0 702 transmits, to the UE 704, a PDCCH order instructing the UE 704 to initiate a random access procedure, and the PDCCH order may indicate which of the TRP0 702 and the TRP1 706 that the UE 704 is to perform the random access procedure with. For example, the PDCCH order may request the UE 704 to send a RACH preamble to the TRP1 706, or to the TRP0 702. The TRP0

702 also transmits DCI (e.g., DCI0 712) to the UE 704 scheduling a PDSCH (e.g., PDSCH0 714) from the TRP0 702, or a PDSCH (e.g., PDSCH1 716) from the TRP1 706, and the DCI/PDSCH may be the RAR as part of the random access procedure, or may be for other DL data transmissions. In this example, only the TRP0 702 sends DCI to the UE 704 (i.e., S-DCI). DMRS (DMRS 718) is used for modulation/demodulation of the DCI0 712 and the PDSCH0 714. The DMRS 718 may be QCLed to a TRS 720 of the TRP0 702. The TRS 720 of the TRP0 702 may be QCLed to a SSB 722 associated with the serving cell (the TRP0 702). The TRP0 702 may also transmit CSI-RS 724 to the UE 704 for channel measurement. The CSI-RS 724 may be QCLed to the SSB 722 or QCLed to the TRS 720. DMRS (e.g., DMRS 726) is used for modulation/demodulation of the PDSCH1 716 of the TRP1 706. The DMRS 726 may be QCLed to a TRS 728 of the TRP1 706. The TRP1 706 not configured as the serving cell does not have an associated SSB. The TRP1 706 transmits the TRS 728, and the TRS 728 may be QCLed to the SSB 722 or QCLed to the TRS 720 with a weak QCL assumption (such as QCL Type C, or even QCL for average delay only). In general, for TRPs not co-located, they may only share rough/coarse time/frequency synchronization such as slot/OFDM symbol boundaries and subcarrier/PRB alignment, but not Doppler shift, Doppler spread, average gain, delay spread, spatial receive parameters, etc. However, if the TRPs are not too far away from each other and tightly synchronized, QCL Type C to the SSB 722 or TRS 720 may be assumed. The TRP1 706 may send CSI-RS 730 to the UE 704, base on which the UE 704 may estimate PL between the UE 704 and the TRP1 706, and send a RACH preamble (e.g., non-contention based) in a random access procedure to the TRP1 706 based on the estimated PL. The CSI-RS 730 may be QCLed to the TRS 728. In this example, the PL is based on the CSI-RS of the TRP1 706, and the RACH to the TRP1 706 is based on the PL. However, other steps of the random access procedure are performed between the UE 704 and the TRP0 702 based on the TRP0 702 and a PCID associated with the SSB 722 (this is similar to what is specified in R16). In an embodiment, the TRS 728 is not QCLed to SSB 722 or TRS 720, but the UE needs to search the TRS 728 similar to a discovery signal (DS) within a search time window.

Figure 8:
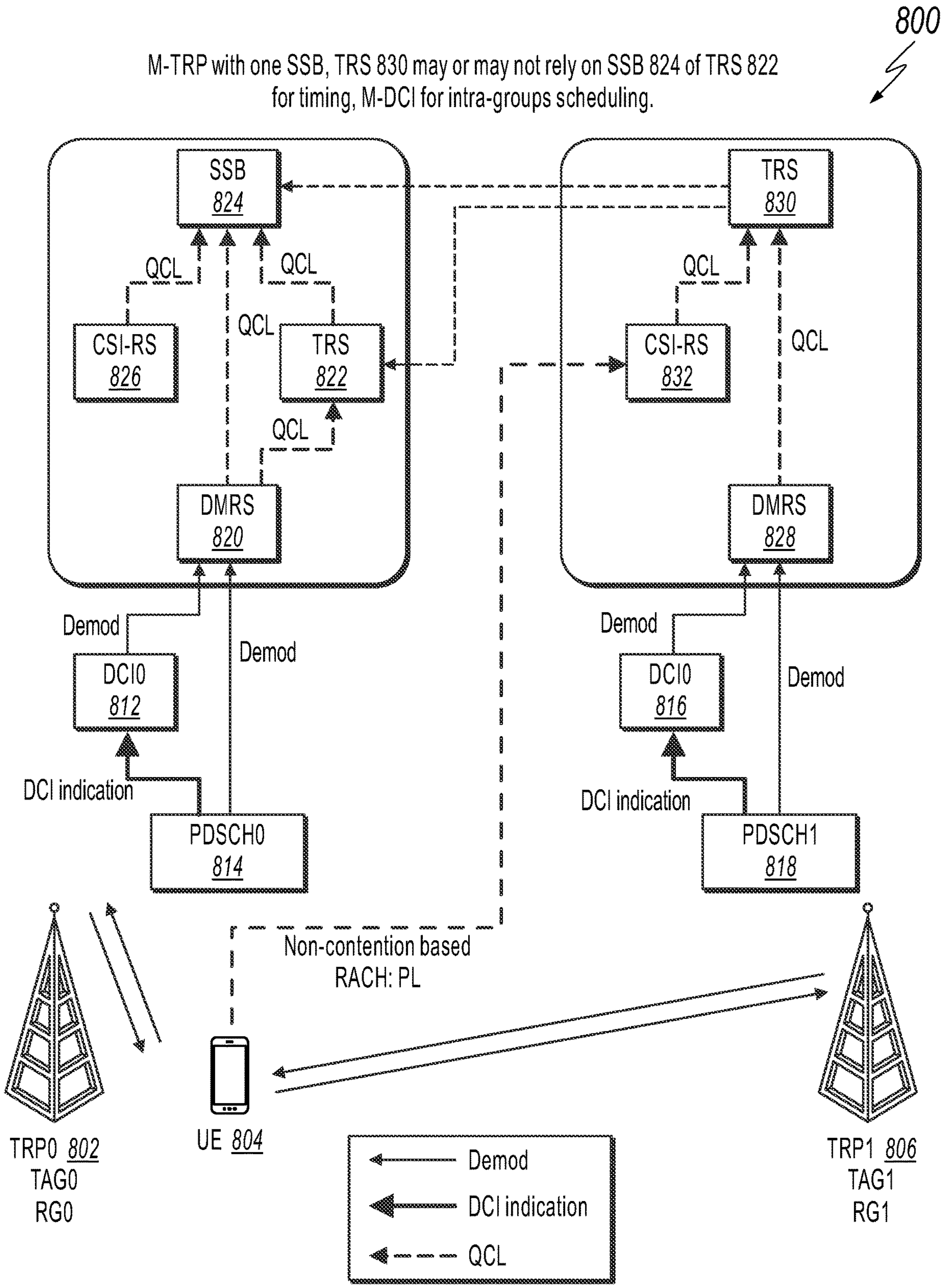
FIG. 8 shows a diagram illustrating another example scenario in FIG. 6.

FIG. 8 shows a diagram 800 illustrating the example scenario 2 in Table 600 of FIG. 6. The diagram 800 shows a TRP0 802 configured as a serving cell of a UE 804 over a carrier. A TRP1 806 not configured as a serving cell of the UE 804 is co-channel with the TRP0 802. The TRP0 802 and the TRP1 806 provide M-TRP communication services to UEs in the serving cell. In this example, the TRP0 802 and the TRP1 806 are synchronized with each other and have fast backhaul between the TRP0 802 and the TRP1 806. Separate RGs (i.e., RG0 and RG1) are configured for the TRP0 802 and the TRP1 806.

Different from the scenario 1 of FIG. 7, in this example, each of the TRP0 802 and the TRP1 806 may send a PDCCH order instructing the UE 804 to initiate a random access procedure with a TRP, i.e., the TRP0 802 or the TRP1 806. For example, the TRP0 802 may send a PDCCH order requesting the UE 804 to send a RACH preamble to the TRP0 802 or to the TRP1 806. Similarly, the TRP1 806 may send a PDCCH order requesting the UE 804 to send a RACH preamble to the TRP0 802 or to the TRP1 806. In an example, the PDCCH order may include an indication to indicate which of the TRP0 802 or the TRP1 806 that the UE 804 is to send the RACH preamble to. In another example, the PDCCH order does not include such indication, and the UE 804 determines that the TRP who sends the PDCCH order is the one that the UE 804 is to send the RACH preamble to. The TRP0 802 and the TRP1 806 transmit their respective DCI for scheduling their respective PDSCHs. For example, as shown, the TRP0 802 transmits DCI (e.g., DCI0 812) to the UE 804 scheduling a PDSCH (e.g., PDSCH0 814) from the TRP0 802. The TRP1 806 transmits DCI (e.g., DCI0 816) to the UE 804 scheduling a PDSCH (e.g., PDSCH1 818) from the TRP1 806. In this example, both the TRP0 802 sends DCI to the UE 804 (i.e., M-DCI). The DCI/PDSCH may be the RAR as part of the random access procedure, or may be for other DL data transmissions.

DMRS (e.g., DMRS 820) is used for modulation/demodulation of the DCI0 812 and the PDSCH0 814. The DMRS 820 may be QCLed to a TRS 822 of the TRP0 802. The TRS 822 of the TRP0 802 may be QCLed to a SSB 824 associated with the serving cell (the TRP0 802). A CSI-RS 826 of the TRP0 802 may be QCLed to the SSB 824. DMRS (e.g., DMRS 828) is used for modulation/demodulation of the DCI1 816 and the PDSCH1 818 of the TRP1 806. The DMRS 828 may be QCLed to a TRS 830 of the TRP1 806. The TRP1 806 not configured as a serving cell of the UE 804 does not have an associated SSB. The TRP1 806 may send CSI-RS 832 to the UE 804, base on which the UE 804 may estimate PL between the UE 804 and the TRP1 806, and send a RACH preamble (e.g., non-contention based) in a random access procedure to the TRP1 806 based on the estimated PL. The CSI-RS 832 may be QCLed to the TRS 830. In this example, the PL is based on the CSI-RS of the TRP1 806, and the RACH to the TRP1 806 is based on the PL. However, other steps of the random access procedure are performed between the UE 804 and the TRP0 802 based on the TRP0 802 and a PCID associated with the SSB 824 (this is similar to what is specified in R16). In an embodiment, the TRS 830 is not QCLed to SSB 824 or TRS 822, but the UE 804 needs to search the TRS 830 similar to a discovery signal (DS) within a search time window.

Figure 9:
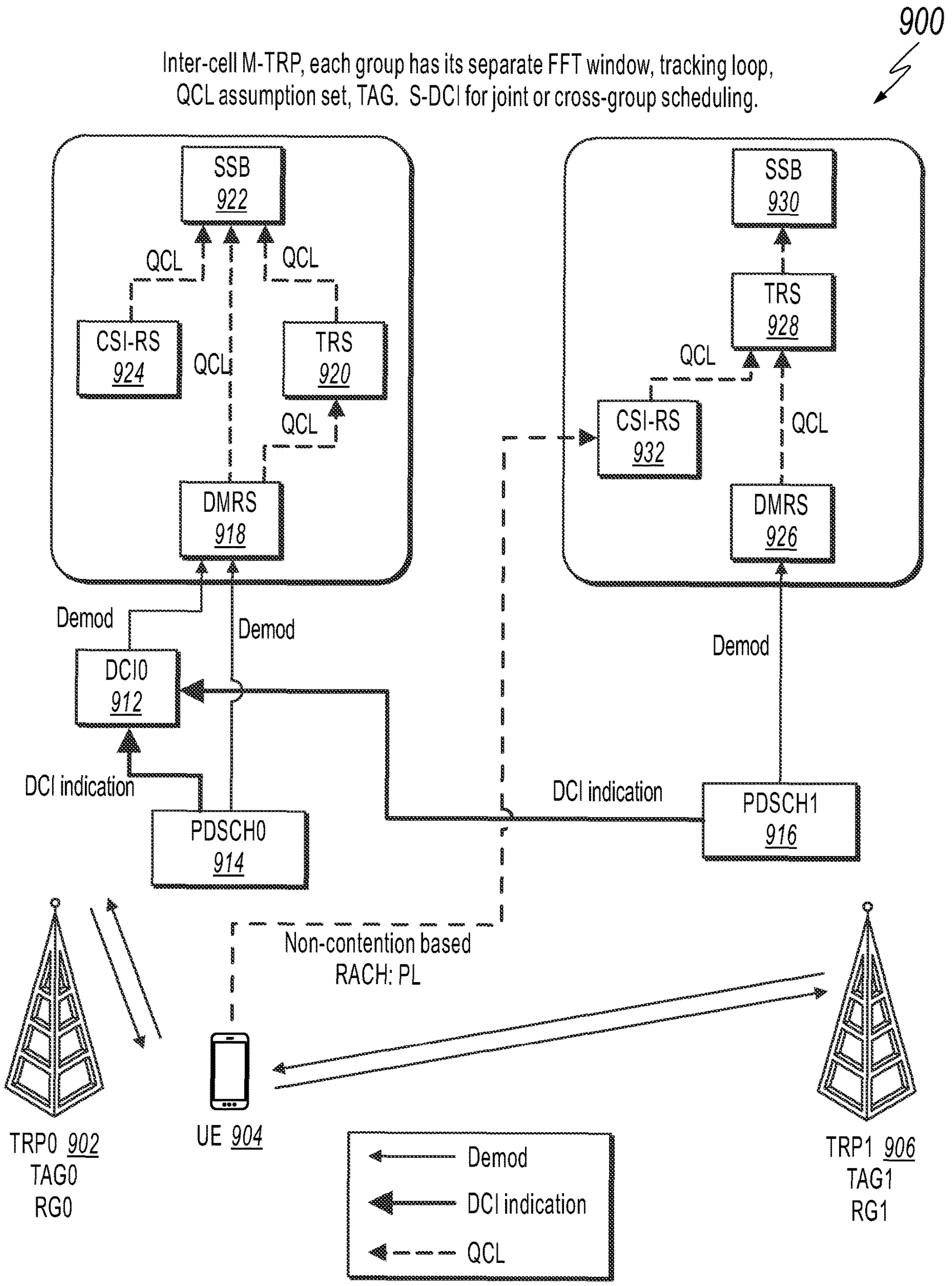
FIG. 9 shows a diagram illustrating another example scenario in FIG. 6.

FIG. 9 shows a diagram 900 illustrating the example scenario 5 shown in Table 600 of FIG. 6. The diagram 900 shows a TRP0 902 configured as a serving cell of a UE 904 over a carrier. The serving cell is associated with a SSB 922. A TRP1 906 is associated with a SSB 930 but not configured as a secondary cell of the UE 904. The TRP0 902 and the TRP1 906 provide M-TRP communication services to UEs over the carrier. In this example, the TRP0 902 and the TRP1 906 are synchronized with each other for communication between the TRP0 902 and the TRP1 906. Separate RGs (i.e., RG0 and RG1) are configured for the TRP0 902 and the TRP1 906. The TRP0 902 may transmit, to the UE 904, a PDCCH order instructing the UE 904 to initiate a random access procedure, and may indicate which of the TRP0 902 and the TRP1 906 that the UE 904 is to send a RACH preamble. For example, the PDCCH order may request the UE 904 to send a RACH preamble to the TRP1 906, or to the TRP0 902. The TRP0 902 transmits DCI (e.g., DCI0 912) to the UE 904 for scheduling a PDSCH (e.g., PDSCH0 914) from the TRP0 902, or a PDSCH (e.g., PDSCH1 916) from the TRP1 906, as part of the random access procedure, or may be for other DL data transmissions. In this example, only the TRP0 902 sends DCI to the UE 904 (i.e., S-DCI). DMRS (e.g., DMRS 918) is used for modulation/demodulation of the DCI0 912 and the PDSCH0 914. The DMRS 918 may be QCLed to a TRS 920 of the TRP0 902. The TRS 920 of the TRP0 902 may be QCLed to the SSB 922 associated with the serving cell (the TRP0 902). The TRP0 902 may also transmit CSI-RS 924 to the UE 904 for channel measurement. The CSI-RS 924 may be QCLed to the SSB 922. DMRS (e.g., DMRS 926) is used for modulation/demodulation of the PDSCH1 916 of the TRP1 906. The DMRS 926 may be QCLed to a TRS 928 of the TRP1 906. Different from the scenario 1 of FIG. 7, in this example, the TRP1 906 is associated with the SSB 930. The SSB 930 may be configured to associate with the TAG1, but not configured as a secondary cell (SCell) of the UE 904. The TRS 928 may be QCLed to the SSB 930. The TRP1 906 may send a CSI-RS 932 to the UE 904, base on which the UE 904 may estimate PL between the UE 904 and the TRP1 906, and send a RACH preamble (e.g., non-contention based) in a random access procedure to the TRP1 906 based on the estimated PL. The CSI-RS 932 may be QCLed to the TRS 928. In this example, the PL is based on the CSI-RS of the TRP1 906, and the RACH to the TRP1 906 is based on the PL. However, other steps of the random access procedure are performed between the UE 904 and the TRP0 902 based on the TRP0 902 and a PCID associated with the SSB 922 (this is similar to what is specified in R16). The scrambling IDs used with TRP1 906 may be based on the associated non-serving SSB, or may be configured for one or more of signals/channels for transmissions with the TRP1 906.

Figure 10:
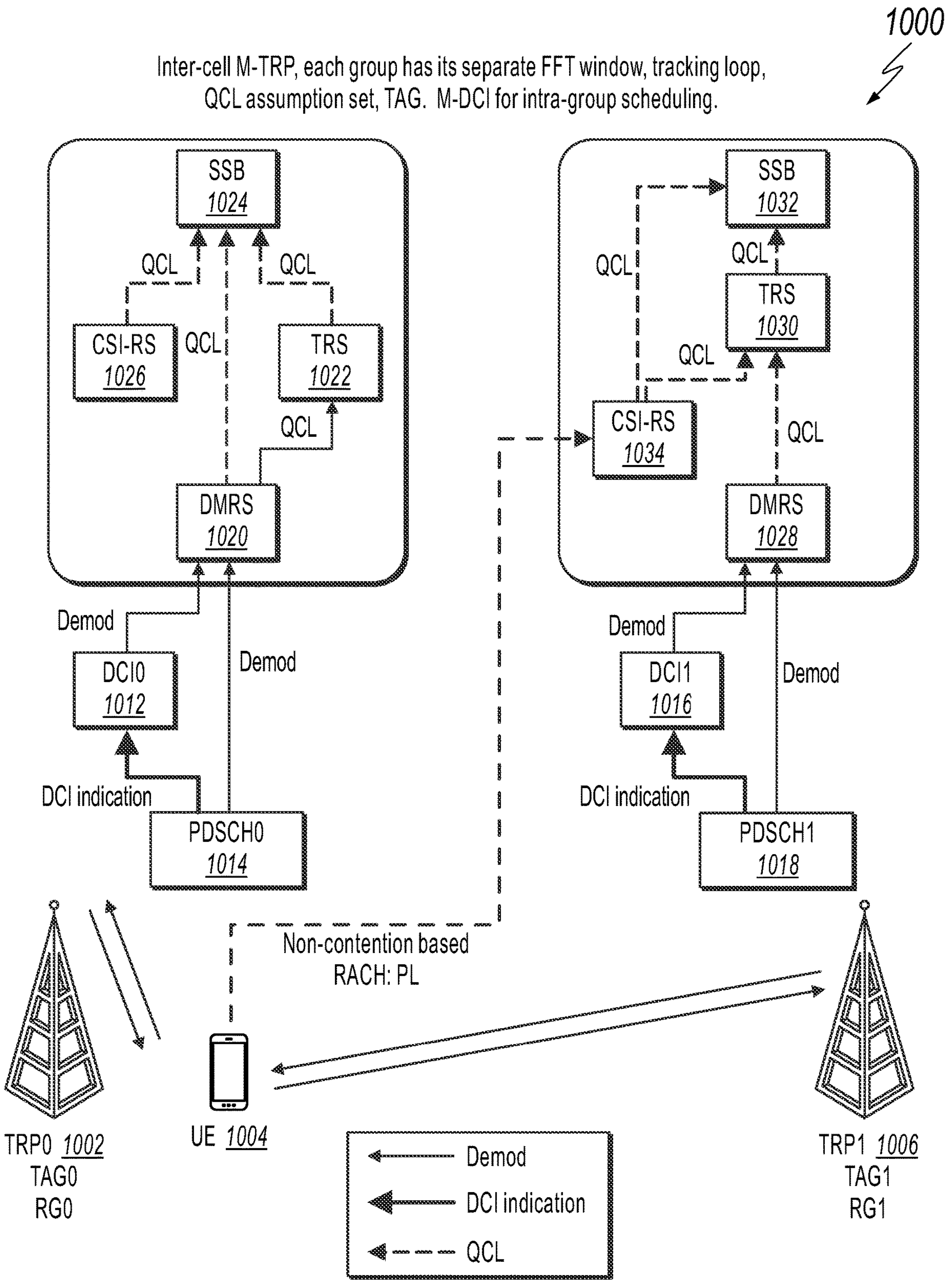
FIG. 10 shows a diagram illustrating three example scenarios in FIG. 6.

FIG. 10 shows a diagram 1000 illustrating the example scenarios 6, 7, and 8 in Table 600 of FIG. 6. The diagram 1000 shows a TRP0 1002 configured as a serving cell of a UE 1004 over a carrier. The serving cell is associated with a SSB 1024. A TRP1 1006 is associated with a SSB 1032, and the TRP1 1006 may be or not be configured as a secondary cell of the UE 1004 over the carrier. The TRP0 1002 and the TRP1 1006 provide M-TRP communication services to UEs over the carrier. In this example, the TRP0 1002 and the TRP1 1006 may be or may not be synchronized with each. Separate RGs (i.e., RG0 and RG1) are configured for the TRP0 1002 and the TRP1 1006. TRP0 1002 transmits TRS/CSI-RS/DMRS which can be QCLed to the associated SSB 1024, directly or indirectly via other RS. TRP1 1006 transmits TRS/CSI-RS/DMRS which can be QCLed to the associated SSB 1032, directly or indirectly via other RS. For example, in the case of spatial division multiplex (SDM) with overlapping time/frequency resources, multiple PDSCH DMRS ports are QCLed to TRS/CSI-RS of the respective TRPs (e.g., QCL Type A), and the TRS/CSI-RS are further QCLed to the SSBs of the respective TRPs (e.g., QCL Type A). For another example, in the case of SDM with overlapping time/frequency resources, the multiple PDSCH DMRS ports are directly QCLed to the SSBs of the respective TRPs (e.g., QCL Type A). Note that the PDSCH DMRS ports may not be in one CDM group as they are for different TRPs with non-negligible timing difference or far away from each other. Likewise, PDCCH DMRS ports may also need to have such QCL/TCI states configured, but the PDCCH DMRS ports for one PDCCH are all from one TRP. FDM/TDM may also be considered in similar but generally simpler ways.

Each of the TRP0 1002 and the TRP1 1006 may send a PDCCH order instructing the UE 1004 to initiate a random access procedure. In this example, a PDCCH order is linked to a TRP. That is, The PDCCH order itself implies that the UE 1004 initiate a random access procedure to the TRP linked with the PDCCH order. The TRP0 1002 and the TRP1 1006 transmit their respective DCI scheduling their respective PDSCHs. For example, as shown, the TRP0 1002 transmits DCI (e.g., DCI0 1012) to the UE 1004 scheduling a PDSCH (e.g., PDSCH0 1014) from the TRP0 1002. The TRP1 1006 transmits DCI (e.g., DCI1 1016) to the UE 1004 scheduling a PDSCH (e.g., PDSCH1 1018) from the TRP1 1006. In this example, both the TRP0 1002 sends DCI to the UE 1004 (i.e., M-DCI). DMRS (e.g., DMRS 1020) is used for modulation/demodulation of the DCI0 1012 and the PDSCH0 1014. The DMRS 1020 may be QCLed to a TRS 1022 of the TRP0 1002. The TRS 1022 of the TRP0 1002 may be QCLed to the SSB 1024 associated with the serving cell (the TRP0 1002). A CSI-RS 1026 may be QCLed to the SSB 1024. DMRS (e.g., DMRS 1028) is used for modulation/demodulation of the DCI1 1016 and the PDSCH1 1018 of the TRP1 1006. The DMRS 1028 may be QCLed to a TRS 1030 of the TRP1 1006. The TRS 1030 of the TRP1 1006 may be QCLed to the SSB 1032 associated with the TRP1 1006.

The SSB 1032 may be configured to associate with the TAG1, but not configured as a SCell of the UE 1004. The TRS 1030 may be QCLed to the SSB 1032. The TRP1 1006 may send a CSI-RS 1034 to the UE 1004, base on which the UE 1004 may estimate PL between the UE 1004 and the TRP1 1006, and send a RACH preamble (e.g., non-contention based) in a random access procedure to the TRP1 1006 based on the estimated PL. The CSI-RS 1034 may be QCLed to the TRS 1030 or the SSB 1032. In this example, the PL is based on the CSI-RS of the TRP1 1006, and the RACH to the TRP1 1006 is based on the PL. However, other steps of the random access procedure (e.g., RAR) are performed between the UE 1004 and the TRP0 1002 based on the TRP0 1002 and a PCID associated with the SSB 1024 (this is similar to what is specified in R16). The scrambling IDs used with TRP1 1006 may be based on the associated non-serving SSB 1032, or may be configured for one or more of signals/channels for transmissions with the TRP1 1006.

In some embodiments, examples of M-TRP PUCCH enhancement are described. In URLLC, to meet 1E-5 BLER requirement for data transmission, PUCCH reliability needs to be at least the same or better (i.e., lower) than 1E-5 BLER, preferably an order of magnitude better. In Rel-16, separate and/or joint A/N feedback in PUCCH is supported. For separate A/N, TDMed long and/or short PUCCH is supported, and each PUCCH resource may be associated with a higher layer index per CORESET. For joint A/N, joint semi-static HARQ-ACK codebook can be used and A/N bits are concatenated in a certain order. Switching between separate and joint A/N feedback is supported via RRC configuration. In one embodiment, above enhancement of PUCCH with ACK/NACK to PUCCH with CSI is extended, including: 1) Allow separate and/or joint CSI feedback in PUCCH; 2) Distinguish URLLC-oriented CSI reporting vs non-URLLC-oriented CSI reporting, in terms the contents, format, repetition, collision handling, etc., an explicit bit may be used to signal the UE that a CSI is associated with higher priority so other transmission is dropped when colliding with the PUCCH carrying the CSI with higher priority; 3) TDM of M-TRP PUCCH, and PUCCH repetition in time domain (UE transmitting the same PUCCH multiple times to the same TRP) and spatial domain (UE transmitting the same PUCCH multiple times to multiple TRPs, respectively). In one embodiment, one PDCCH/PDSCH transmission followed by multiple (i.e., repetition) PUCCH A/N feedback can be allowed. The UE may perform repeated A/N transmissions to one of the TRPs or both TRPs. This may be useful if the reliability of ACK/NACK feedback cannot reach the target BLER. In one embodiment, soft combining/joint reception at the network side can be allowed. Whether it is feasible to perform soft combining/joint reception by multiple TRPs may depend on backhaul assumptions between the TRPs. However, for the same TRP, soft combining of repeated PUCCH transmission is always feasible.

In some embodiments, examples of M-TRP PUSCH enhancement are described. In an embodiment, TDM of M-TRP PUSCH is supported. PUSCH repetition in time domain (repeated for the same TRP) and spatial domain (repeated for multiple TRPs) can be supported. The repetition should be for same TB, but the same or different RVs may be used for the multiple PUSCHs. In an embodiment, single-DCI and multi-DCI to schedule PUSCH are supported, similar to single-DCI and multi-DCI to schedule PDSCH. In an embodiment, the network and UE distinguish URLLC-oriented PUSCH vs non-URLLC-oriented PUSCH, in terms of the contents, format, repetition, collision handling, etc. An explicit bit may be used to signal the UE that a PUSCH is associated with higher priority so other transmission is dropped when colliding with the PUSCH with higher priority. The PUSCH may carry URLLC UL data, URLLC related A/N feedback, and/or URLLC related CSI report.

In some embodiments, examples of M-TRP PDCCH enhancement are described. In an embodiment, PDCCH repetition in time domain (repeated by the same TRP) and spatial domain (repeated by multiple TRPs) are supported. For example, DCI1 may be sent from TRP1, and DCI1 could be an S-DCI to schedule PUSCHs/PDSCHs jointly for TRP1 and TRP2, or one of the M-DCIs to schedule PUSCH/PDSCH only for TRP1. DCI1 may be repeated in a later OFDM symbol, sent by TRP1, TRP2, or even both. The PDCCH repetition can be useful for higher reliability. However, one issue needs to be resolved. When the UE receives multiple PDCCH transmissions, each schedules a PDSCH (or a PUSCH). The UE may not understand that these PDCCH transmissions are actually the repetition and they should lead to only one PDSCH (or only one PUSCH). The UE may incorrectly assume it is scheduled for two PDSCH transmissions (or two PUSCH transmissions) at the same time and decide to drop one or both of the transmissions. This is an example showing that PDCCH repetitions have to be explicitly signaled to the UE. Otherwise, UE assumptions should be standardized so that the UE assumes PDCCH repetition based on identical resource allocation in the multiple DCIs. The explicit signaling may be a field in the DCI as a flag, and DCIs with the same flag are assumed to schedule the same PDSCH or PUSCH. Embodiments also include cross-TRP (TRP1 DCI to schedule TRP2 PDSCH/PUSCH or vice versa) scheduling, joint DCI (S-DCI to schedule for both TRPs) sent from either TRP, or joint transmission of the same DCI (for one or separate PDSCH/PUSCH transmissions in one or both TRPs). To support these enhancements, the QCL/TCI states and CORESET pool indexes should be enhanced to ensure that the transmissions are correctly associated with the intended TRP(s).

The DL operations under HST-SFN deployment scenario relies on Rel-16 eMIMO multi-TRP based URLLC Scheme 1c with a single DCI. The agreement regarding Scheme 1c is as follows:

To facilitate further down-selection for one or more schemes in RAN1 #96bis, schemes for multi-TRP based URLLC, scheduled by single DCI at least, are clarified as following:

- Scheme 1 (SDM): n ($n<=N_s$) TCI states within the single slot, with overlapped time and frequency resource allocation
- Scheme 1c: One transmission occasion is one layer of the same TB with one DMRS port associated with multiple TCI state indices, or one layer of the same TB with multiple DMRS ports associated with multiple TCI state indices one by one.

Based on Scheme 1c, the Rel-17 HST-SFN may operate according to the following manner:

Network Configuration

Multiple TRPs are connected with ideal backhaul with the same cell ID to serve UEs on HST.

SSB Configuration

In principle, some TRPs may not need to transmit SSB and transmission of TRP-specific TRS may be sufficient for data transmissions, but since the distances between the TRPs are usually a few hundred meters, it may be desirable to have all TRPs transmit SSBs to cover the entire range. So generally, each TRP can transmit a SSB associated with the common cell ID. The SSB may be the same for some or all TRPs (i.e., SFN for SSB) or TRP-specific SSBs; however, as the SSBs are transmitted directionally along the HST directions, i.e., with different beams, generally the SSBs should be TRP-specific SSBs.

TRS Configuration

There may be two options for TRS pre-compensation for Doppler shifts:

Option 1 TRS design: no or little pre-compensation for Doppler shifts, with TRP-specific TRS For this option, the TRPs are synchronized, and they transmit in a synchronized fashion without pre-compensation for Doppler shifts. Then UE sees different Doppler shifts for different TRSs, i.e., the TRS are TRP-specific. Based on the TRS, a UE can estimate TRP-specific Doppler shift. Note that different TRPs have significantly different Doppler shifts for HST.

Each TRP-specific TRS can be QCLed (Type A, and for FR2, also Type D) to the corresponding TRP-specific SSB.

Option 2 TRS design: with pre-compensation for Doppler shifts, and SFN for TRS from different TRPs For this option, the TRPs are synchronized, and they transmit in a synchronized fashion with sufficient pre-compensation for Doppler shifts. Then UE sees nearly the same Doppler shifts for different TRSs, and therefore the TRSs can form a SFN. Based on the TRS, a UE can estimate residual Doppler shift if needed.

The TRS can be QCLed to one or more of the SSBs.

PDSCH DMRS Configuration

Multiple TRPs transmit the same PDSCH (and possibly PDCCH) on the same time-frequency resources, forming a SFN essentially based on Scheme 1c.

Note that each TRP can transmit all layers (say L layers), i.e., all TRPs (say n TRPs) transmit all L layers of the same TB/codeword. This is a straightforward generalization of the one layer in Rel-16 Scheme 1c. Note also that the SFN is possible thanks to the ideal backhaul among the TRPs.

There are two options for the DMRS for PDSCH:

Option A: SFN DMRS port(s) for all TRPs

For this option, the UE receives L DMRS ports, and each DMRS port corresponds to a layer from all TRPs. In other words, each DMRS port is formed by the SFN of all TRPs. The DMRS port needs to be simultaneously QCLed to the TRSs:

Option A-1: SFN DMRS port(s) QCLed to TRP-specific TRS

The SFN DMRS needs to be associated with multiple TCI state indices, each TCI state index specifies a QCL relation to the TRP-specific TRS of a TRP. QCL type A (Doppler shift, Doppler spread, average delay, delay spread) should be specified in the TCI state.

An example of the QCL configuration for the DMRS port(s) is:

TCI state 1: QCL A, TRS 1 (for TRP 1)

TCI state 2: QCL A, TRS 2 (for TRP 2)

. . .

TCI state n: QCL A, TRS n (for TRP n)

Option A-2: SFN DMRS port(s) QCLed to SFN TRS

The SFN DMRS can be associated with one TCI state index, which specifies a QCL relation to the SFN TRS of TRPs. QCL type A (Doppler shift, Doppler spread, average delay, delay spread) should be specified in the TCI state.

An example of the QCL configuration for the DMRS port(s) is:

TCI state: QCL A, TRS (for all TRPs)

Option B: TRP-specific DMRS ports

For this option, the UE receives nxL DMRS ports. The nxL ports can form L sets, each set containing n ports associated with a same layer from the n TRPs. The nxL ports can also form n groups, each group containing L ports associated with a same TRP for the L layers (a group could be a CDM group). Likely the L ports for the same TRP can be a CDM group, but ports for different TRPs should be orthogonalized in time/frequency/sequence domain. This option works only with Option 1 TRS design with TRP-specific TRSs.

Note that though the WID does not list Option B as an example, it is not precluded.

An example of the QCL configuration for the DMRS ports is:

$1^{st}$ group of L DMRS ports: TCI state 1: QCL A, TRS 1 (for TRP 1)

$2^{nd}$ group of L DMRS ports: TCI state 2: QCL A, TRS 2 (for TRP 2)

. . .

$n^{th}$ group of L DMRS ports: TCI state n: QCL A, TRS n (for TRP n)

From the above description, the following issues may need to be addressed in Rel-17:

Decision on supporting TRS/DMRS options, e.g., Option A (Option A-1 and Option A-2) and/or Option B.

Option A has a lower DMRS overhead but the channel estimation on the DMRS with a composite channel from all TRPs may be more complicated and less accurate than Option B. Especially Option A-1 channel estimation may be challenging. The tradeoff should be studied in Rel-17 and an agreement is needed which one or both should be supported.

Specify UE Behavior/Assumption

For either options, UE assumption and minimum UE behavior (if any) need to be specified. For example, for Option A, the UE needs to assume the channel on a DMRS port is a composite channel, a superposition of individual channels associated with the TRSs. For Option B, the UE needs to assume the channel for PDSCH is a composite channel, a superposition of individual channels associated with the corresponding n DMRS ports.

In order for the network to apply Doppler shift pre-compensation value for each TRP before transmitting the SFN PDSCH, the UE may need to transmit SRS to each TRP, and the SRS may be based on the Doppler shift the UE experiences for that TRP in DL. This may require the UL signal and DL signal to be associated, e.g., with respect to the Doppler shift. This can be fit into the generic QCL framework, i.e., the UL/DL signals can be defined as QCLed. In addition, defining the UL/DL signal relation as QCL has a significant advantage, as the QCL/TCI information can be signaled to a UE in a dynamic fashion via DCI, which offers much higher flexibility in a dynamic network deployment scenario (such as a HST) than using RRC/MAC based signaling framework.

Figure 11:
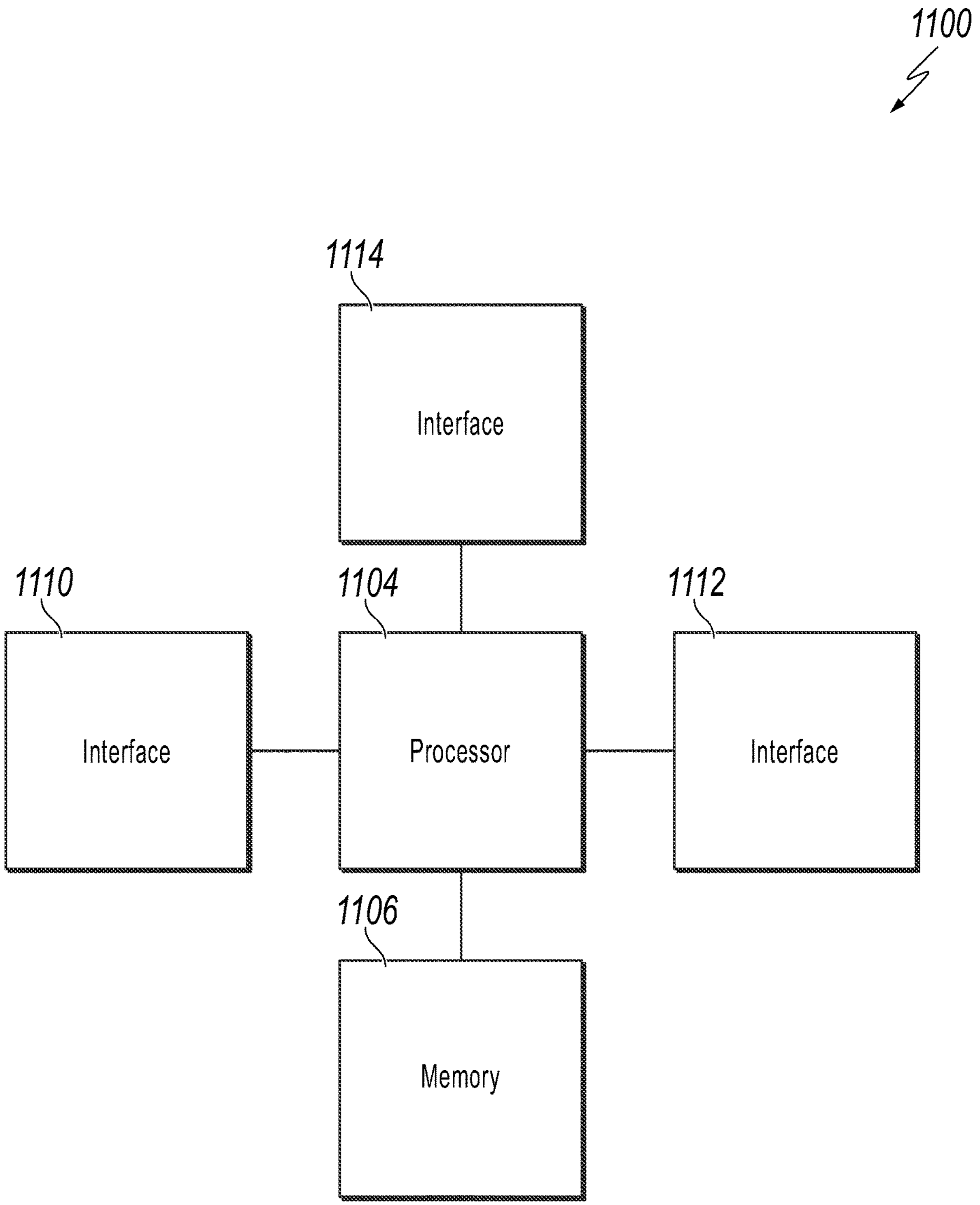
FIG. 11 shows an example processing system.

Embodiments of the present disclosure may be implemented as computer-implemented methods. The embodiments may be performed by a processing system. FIG. 11 shows an example processing system 1100 for performing methods described herein, which may be installed in a host device. As shown, the processing system 1100 includes at least one processor 1104, at least one memory 1106, and interfaces 1110, 1112, and 1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, and 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
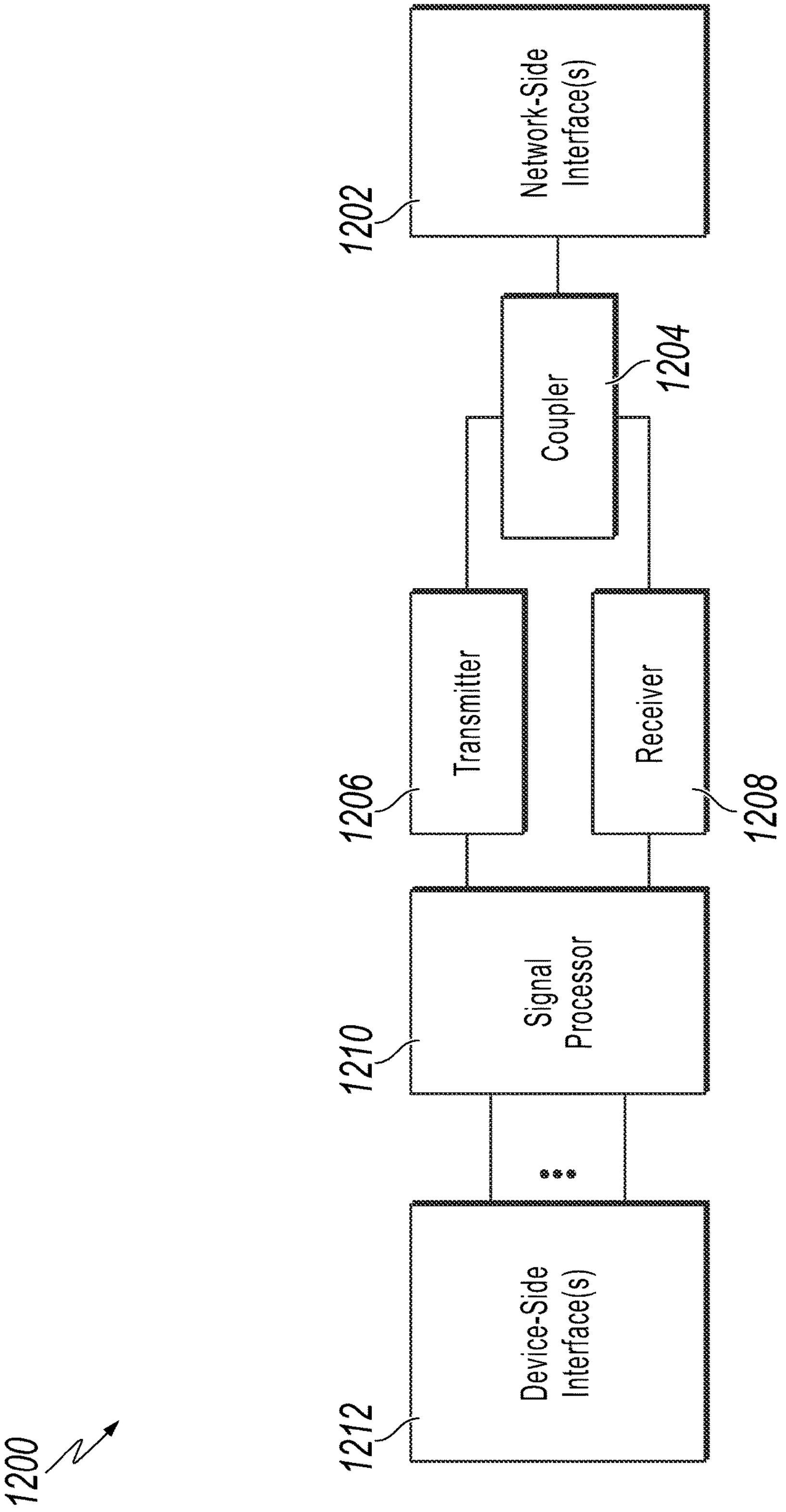
FIG. 12 shows an example transceiver.

In some embodiments, one or more of the interfaces 1110, 1112, 1114 connects the processing system 1100 to a transceiver adapted to transmit and receive signaling over the telecommunications network. FIG. 12 shows an example transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100 of FIG. 11, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method, comprising:

receiving, by a user equipment (UE), first configuration information of a bandwidth part (BWP) in a carrier for a serving cell, the first configuration information configuring a first signal or channel on the BWP in the carrier for the serving cell, wherein the first signal or channel is associated with a first synchronization signal block (SSB), and wherein the first configuration information indicates a first parameter associated with the first SSB;

receiving, by the UE, second configuration information of the BWP in the carrier, the second configuration information configuring a second signal or channel on the BWP in the carrier, wherein the second signal or channel is associated with a second SSB different from the first SSB, and wherein the second configuration information indicates a second parameter associated with the second SSB; and performing, by the UE, first transmission or first reception of the first signal or channel in accordance with the first parameter associated with the first SSB and performing second transmission or second reception of the second signal or channel in accordance with the second parameter associated with the second SSB.

2. The method of claim 1, wherein the first signal or channel is a first uplink (UL) signal or channel or a first downlink (DL) signal or channel, and the second signal or channel is a second UL signal or channel or a second DL signal or channel.

3. The method of claim 2, wherein the first SSB is associated with the serving cell and is generated with a first physical cell identifier (PCI) of the serving cell, and wherein the second SSB is generated with a second PCI.

4. The method of claim 3, wherein the second PCI is configured for the carrier of the serving cell and is different from the first PCI.

5. The method of claim 1, wherein the first signal or channel is a first CSI-RS for tracking, wherein the first SSB is associated with the serving cell and is generated with a first physical cell identifier (PCI) of the serving cell, and wherein the first CSI-RS for tracking is quasi-co-located (QCLed) with the first SSB, and wherein the second signal or channel is a second CSI-RS for tracking, wherein the second CSI-RS for tracking is QCLed with the second SSB, and wherein the second SSB is generated with a second PCI.

6. The method of claim 5, further comprising:

receiving, by the UE, third configuration information of the BWP in the carrier of the serving cell, the third configuration information configuring a third signal or channel on the BWP in the carrier of the serving cell, and wherein the third signal or channel is at least one of:

a third CSI-RS or a third physical downlink control channel (PDCCH) demodulation reference signal (DMRS) or a third physical downlink shared channel (PDSCH) DMRS, and is QCLed with the first SSB or the first CSI-RS for tracking, a third CSI-RS or a third PDCCH DMRS or a third PDSCH DMRS, and is QCLed with a CSI-RS that is QCLed with the first SSB or the first CSI-RS for tracking, a third sounding reference signal (SRS) or a third physical uplink control channel (PUCCH) DMRS or a third physical uplink shared channel (PUSCH) DMRS configured with a pathloss RS or a spatial-relation RS that is the first SSB or the first CSI-RS for tracking, or QCLed with an RS that is the first SSB or the first CSI-RS for tracking, or a third SRS or a third PUCCH DMRS or a third PUSCH DMRS configured with a pathloss RS or a spatial-relation RS that is QCLed with the first SSB or the first CSI-RS for tracking, or QCLed with an RS that is QCLed with the first SSB or the first CSI-RS for tracking.

7. The method of claim 6, further comprising:

receiving, by the UE, fourth configuration information of the BWP in the carrier, the fourth configuration information configuring a fourth signal or channel on the BWP in the carrier, and wherein the fourth signal or channel is at least one of:

a fourth CSI-RS or a fourth PDCCH DMRS or a fourth PDSCH DMRS, and is QCLed with the second SSB or the second CSI-RS for tracking, a fourth CSI-RS or a fourth PDCCH DMRS or a fourth PDSCH DMRS, and is QCLed with a CSI-RS that is QCLed to the second SSB or the second CSI-RS for tracking, a fourth SRS or a fourth PUCCH DMRS or a fourth PUSCH DMRS configured with a pathloss RS or a spatial-relation RS or a QCL RS that is the second SSB or the second CSI-RS for tracking, or a fourth SRS or a fourth PUCCH DMRS or a fourth PUSCH DMRS configured with a pathloss RS or a spatial-relation RS or a QCL RS that is QCLed with the second SSB or the second CSI-RS for tracking.

8. The method of claim 7, wherein the first signal or channel and the third signal are associated with a first timing advance (TA) value, wherein the second signal or channel and the fourth signal or channel are associated with a second TA value.

9. The method of claim 7, wherein the first signal or channel or the third signal or channel is configured with a first transmission configuration indication (TCI) state, wherein the second signal or channel or the fourth signal or channel is configured with a second TCI state.

10. The method of claim 1, wherein the first parameter or the second parameter is one of a QCL parameter, a TCI state parameter, or a TA value.

11. A user equipment (UE), comprising:

a non-transitory memory storage storing instructions; and one or more hardware processors in communication with the non-transitory memory storage, wherein the one or more hardware processors execute the instructions to cause the UE to perform operations comprising:

receiving first configuration information of a bandwidth part (BWP) in a carrier for a serving cell, the first configuration information configuring a first signal or channel on the BWP in the carrier for the serving cell, wherein the first signal or channel is associated with a first synchronization signal block (SSB), and wherein the first configuration information indicates a first parameter associated with the first SSB;

receiving second configuration information of the BWP in the carrier, the second configuration information configuring a second signal or channel on the BWP in the carrier, wherein the second signal or channel is associated with a second SSB different from the first SSB, and wherein the second configuration information indicates a second parameter associated with the second SSB; and performing first transmission or first reception of the first signal or channel in accordance with the first parameter associated with the first SSB and performing second transmission or second reception of the second signal or channel in accordance with the second parameter associated with the second SSB.

12. The UE of claim 11, wherein the first signal or channel is a first uplink (UL) signal or channel or a first downlink (DL) signal or channel, and the second signal or channel is a second UL signal or channel or a second DL signal or channel.

13. The UE of claim 12, wherein the first SSB is associated with the serving cell and is generated with a first physical cell identifier (PCI) of the serving cell, and wherein the second SSB is generated with a second PCI.

14. The UE of claim 13, wherein the second PCI is configured for the carrier of the serving cell and is different from the first PCI.

15. The UE of claim 11, wherein the first signal or channel is a first CSI-RS for tracking, wherein the first SSB is associated with the serving cell and is generated with a first physical cell identifier (PCI) of the serving cell, and wherein the first CSI-RS for tracking is quasi-co-located (QCLed) with the first SSB, and wherein the second signal or channel is a second CSI-RS for tracking, wherein the second CSI-RS for tracking is QCLed with the second SSB, and wherein the second SSB is generated with a second PCI.

16. The UE of claim 15, the operations further comprising:

receiving third configuration information of the BWP in the carrier of the serving cell, the third configuration information configuring a third signal or channel on the BWP in the carrier of the serving cell, and wherein the third signal or channel is at least one of:

a third CSI-RS or a third physical downlink control channel (PDCCH) demodulation reference signal (DMRS) or a third physical downlink shared channel (PDSCH) DMRS, and is QCLed with the first SSB or the first CSI-RS for tracking, a third CSI-RS or a third PDCCH DMRS or a third PDSCH DMRS, and is QCLed with a CSI-RS that is QCLed with the first SSB or the first CSI-RS for tracking, a third sounding reference signal (SRS) or a third physical uplink control channel (PUCCH) DMRS or a third physical uplink shared channel (PUSCH) DMRS configured with a pathloss RS or a spatial-relation RS that is the first SSB or the first CSI-RS for tracking, or QCLed with an RS that is the first SSB or the first CSI-RS for tracking, or a third SRS or a third PUCCH DMRS or a third PUSCH DMRS configured with a pathloss RS or a spatial-relation RS that is QCLed with the first SSB or the first CSI-RS for tracking, or QCLed with an RS that is QCLed with the first SSB or the first CSI-RS for tracking.

17. The UE of claim 16, the operations further comprising:

receiving fourth configuration information of the BWP in the carrier, the fourth configuration information configuring a fourth signal or channel on the BWP in the carrier, and wherein the fourth signal or channel is at least one of:

a fourth CSI-RS or a fourth PDCCH DMRS or a fourth PDSCH DMRS, and is QCLed with the second SSB or the second CSI-RS for tracking, a fourth CSI-RS or a fourth PDCCH DMRS or a fourth PDSCH DMRS, and is QCLed with a CSI-RS that is QCLed to the second SSB or the second CSI-RS for tracking, a fourth SRS or a fourth PUCCH DMRS or a fourth PUSCH DMRS configured with a pathloss RS or a spatial-relation RS or a QCL RS that is the second SSB or the second CSI-RS for tracking, or a fourth SRS or a fourth PUCCH DMRS or a fourth PUSCH DMRS configured with a pathloss RS or a spatial-relation RS or a QCL RS that is QCLed with the second SSB or the second CSI-RS for tracking.

18. The UE of claim 17, wherein the first signal or channel and the third signal are associated with a first timing advance (TA) value, wherein the second signal or channel and the fourth signal or channel are associated with a second TA value.

19. The UE of claim 17, wherein the first signal or channel or the third signal or channel is configured with a first transmission configuration indication (TCI) state, and wherein the second signal or channel or the fourth signal or channel is configured with a second TCI state.

20. The UE of claim 11, wherein the first parameter or the second parameter is one of a QCL parameter, a TCI state parameter, or a TA value.

21. A method, comprising:

transmitting, by a base station to a user equipment (UE), first configuration information of a bandwidth part (BWP) in a carrier for a serving cell, the first configuration information configuring a first signal or channel on the BWP in the carrier for the serving cell, wherein the first signal or channel is associated with a first synchronization signal block (SSB), and wherein the first configuration information indicates a first parameter associated with the first SSB;

transmitting, by the base station to the UE, second configuration information of the BWP in the carrier, the second configuration information configuring a second signal or channel on the BWP in the carrier, wherein the second signal or channel is associated with a second SSB different from the first SSB, and the second configuration information indicates a second parameter associated with the second SSB; and performing, by the base station with a second base station, first transmission to the UE or first reception from the UE of the first signal or channel in accordance with the first parameter associated with the first SSB, wherein the second base station performs second transmission or second reception of the second signal or channel in accordance with the second parameter associated with the second SSB.

22. A base station, comprising:

a non-transitory memory storage storing instructions; and one or more hardware processors in communication with the non-transitory memory storage, wherein the one or more hardware processors execute the instructions to cause the base station to perform operations comprising:

transmitting, to a user equipment (UE), first configuration information of a bandwidth part (BWP) in a carrier for a serving cell, the first configuration information configuring a first signal or channel on the BWP in the carrier for the serving cell, wherein the first signal or channel is associated with a first synchronization signal block (SSB), and wherein the first configuration information indicates a first parameter associated with the first SSB;

transmitting, to the UE, second configuration information of the BWP in the carrier, the second configuration information configuring a second signal or channel on the BWP in the carrier, wherein the second signal or channel is associated with a second SSB different from the first SSB, and wherein the second configuration information indicates a second parameter associated with the second SSB; and performing first transmission or first reception of the first signal or channel in accordance with the first parameter associated with the first SSB, wherein a second base station performs second transmission or second reception of the second signal or channel in accordance with the second parameter associated with the second SSB.

* * * * *